(12) United States Patent
Chappellet

(10) Patent No.: US 11,702,595 B2
(45) Date of Patent: Jul. 18, 2023

(54) POLYMERIZABLE LIQUID CRYSTAL

(71) Applicant: ROLIC TECHNOLOGIES AG, Allschwil (CH)

(72) Inventor: Sabrina Chappellet, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 0 days.

(21) Appl. No.: 17/596,635

(22) PCT Filed: Jun. 26, 2020

(86) PCT No.: PCT/EP2020/068084
§ 371 (c)(1),
(2) Date: Dec. 15, 2021

(87) PCT Pub. No.: WO2020/260624
PCT Pub. Date: Dec. 30, 2020

(65) Prior Publication Data
US 2022/0228063 A1  Jul. 21, 2022

(30) Foreign Application Priority Data

Jun. 28, 2019 (EP) .................................... 19183371
Aug. 28, 2019 (EP) .................................... 19194045

(51) Int. Cl.
*G02F 1/1333* (2006.01)
*C09K 19/04* (2006.01)

(52) U.S. Cl.
CPC ...... *C09K 19/04* (2013.01); *C09K 2019/0448* (2013.01)

(58) Field of Classification Search
CPC .............. C09K 19/04; C09K 19/3497; C09K 2019/0448; C09K 2019/3804; C09K 2019/0444; G02F 1/1333
See application file for complete search history.

(56) References Cited

U.S. PATENT DOCUMENTS

| | | |
|---|---|---|
| 4,122,027 A | 10/1978 | Cole, Jr. et al. |
| 4,401,369 A | 8/1983 | Jones |
| 4,565,424 A | 1/1986 | Huffman et al. |
| 4,667,020 A | 5/1987 | Etzbach et al. |
| 5,389,285 A | 2/1995 | Shannon et al. |
| 5,539,074 A | 7/1996 | Herr et al. |
| 6,107,427 A | 8/2000 | Herr et al. |
| 6,201,087 B1 | 3/2001 | Herr et al. |
| 6,632,909 B2 | 10/2003 | Buchecker et al. |
| 7,959,990 B2 | 6/2011 | Cherkaoui et al. |
| 2012/0114907 A1 | 5/2012 | Eckert et al. |
| 2018/0002460 A1 | 1/2018 | Endo et al. |
| 2018/0066189 A1 | 3/2018 | Ishii et al. |
| 2018/0346614 A1 | 12/2018 | Endo et al. |
| 2019/0023986 A1 | 1/2019 | Yoshinari et al. |
| 2019/0062256 A1 | 2/2019 | Horiguchi et al. |
| 2019/0071604 A1 | 3/2019 | Nakajima et al. |
| 2020/0362244 A1* | 11/2020 | Shimamura ........... G02F 1/1335 |
| 2022/0228063 A1* | 7/2022 | Chappellet ............. C09K 19/04 |
| 2022/0298418 A1* | 9/2022 | Chappellet ......... C09K 19/3477 |

FOREIGN PATENT DOCUMENTS

| | | |
|---|---|---|
| EP | 2 698 388 A1 | 2/2014 |
| EP | 2 703 385 A1 | 3/2014 |
| JP | 2016-128403 A | 7/2016 |
| WO | 2016/104317 A1 | 6/2016 |
| WO | 2017/043437 A1 | 3/2017 |

OTHER PUBLICATIONS

International Search Report for PCT/EP2020/068084 dated Oct. 1, 2020.
Written Opinion of the International Searching Authority for PCT/EP2020/068084 dated Oct. 1, 2021.

* cited by examiner

*Primary Examiner* — Geraldina Visconti
(74) *Attorney, Agent, or Firm* — Sughrue Mion, PLLC

(57) ABSTRACT

The invention relates to novel anisotropic compounds of formula

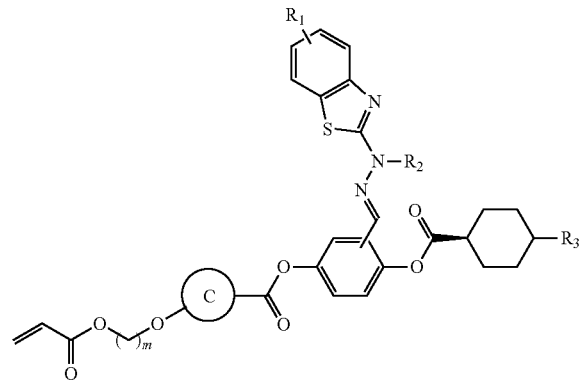

as well as to liquid crystalline mixtures, films and electro-optical devices comprising the compound.

45 Claims, No Drawings

POLYMERIZABLE LIQUID CRYSTAL

CROSS REFERENCE TO RELATED APPLICATIONS

This application is a National Stage of International Application No. PCT/EP2020/068084 filed Jun. 26, 2020, claiming priority based on European Patent Application No. 19183371.4 filed Jun. 28, 2019 and European Patent Application No. 19194045.1 filed Aug. 28, 2019.

BACKGROUND OF THE INVENTION

The present invention relates to novel polymerizable anisotropic Liquid Crystals (LCPs) compounds having a hydrazine-benzothiazole core, to compositions comprising such LCPs compounds and to optical films comprising such LCPs compounds or compositions. Optical films comprising the LCPs according to the present invention shown reverse retardation pattern of polarized light over a wide wavelength band. Finally, the present invention relates to optically anisotropic articles comprising such LCPs compounds or comprising optical films comprising such LCPs compounds such as, e.g. flat displays, TVs, smartphones, tablets.

Optical films prepared from curable LCPs compounds (LCP films) are well known to a skilled person and are used in the preparation of optical devices. Examples of optical films are retardation films or polarizers. Retardation films are a type of optical elements which change the polarization state of light passing through the same. When light passes through a retardation film, the polarization direction of the light changes because of the birefringence and the thickness of the film. Quarter-wave retardation plates convert linearly polarized light into circularly polarized light, and half-wave retardation plates convert the plane of vibration of linearly polarized light by 90°. Such retardation films can achieve conversion of specific monochromatic light so that $\lambda/4$ or $\lambda/2$ retardation occurs. However, the known retardation films have the drawback that the polarized light that passes through is converted into coloured polarized light. Further, a polarization state distribution corresponding to each wavelength occurs for polarized white light. Therefore, it is impossible to achieve accurate $\lambda/4$ or $\lambda/2$ retardation over the entire wavelength band. To improve such drawbacks, there is the need to develop retarder films having a wavelength dispersion which is higher in the long wavelength than in the short wavelength. Another issue in preparation of retardation films, also known as retarders, is to prepare high performing films at a small charge of materials.

There is, therefore, a need for new LCP compounds that may be used in the preparation of an optical film as described above, which significantly reduces the aforementioned disadvantages. The present invention addresses that need.

Several anisotropic LCP compounds are already known in the art, but there is still the demand to develop new LCP compounds with improved uniform conversion of polarized light over a wider wavelength. Few examples of such anisotropic LCP compounds are disclosed in WO2012/147904, WO2016/104317, WO2017/043437 and JP2016/128403.

LCP films are generally manufactured by method well-known by the skilled person. This involves coating an organic solution of a cross-linkable LCP or LCP mixture onto a substrate provided with an orientation layer or onto a substrate which has previously been treated by the rubbing technique. Or other aligning techniques for liquid crystals may be used. The organic solvent is subsequently removed to give a well-oriented, solvent-free LCP layer, which in turn is cross-linked to fix the liquid crystalline properties ordered structure. The desired optical performance of such films depends crucially on some physical parameters which the anisotropic LCP material has to fulfil simultaneously. Such properties are a low melting point or a low tendency to crystallise when cooled below melting point (supercooling), good solubility in organic solvents, good miscibility with other LCPs, good aligning properties on orientation layers, and the ability to form an adjustable tilt out of the substrate plane essentially free of tilt domains and disclinations. Tilt domains are regions within the LCP film in which the long axes of the LCP molecules form tilt angles out of the plane of the substrate of the same size but in opposite direction. Disclinations are borderlines of neighbouring tilt domains where LCP molecules of opposite tilt angles are adjacent. These tilt domains and disclinations result in both a disturbance in the uniform appearance of the film and an inhomogeneous optical performance.

SUMMARY OF THE INVENTION

It is a first object of the present invention to provide an anisotropic LCP compound as described by formula (I) and to compositions comprising at least one of said compounds and at least one additive and/or a solvent.

It is a further object of the present invention to provide an optical film comprising at least one of said anisotropic LCP compound and to methods of its preparation, to the use of said optical film as retardation film achieving uniform conversion of polarized light and to devices comprising said optical films and their manufacturing.

DETAILED DESCRIPTION OF THE INVENTION

The first aspect of the invention provides a liquid crystalline compound of formula (I)

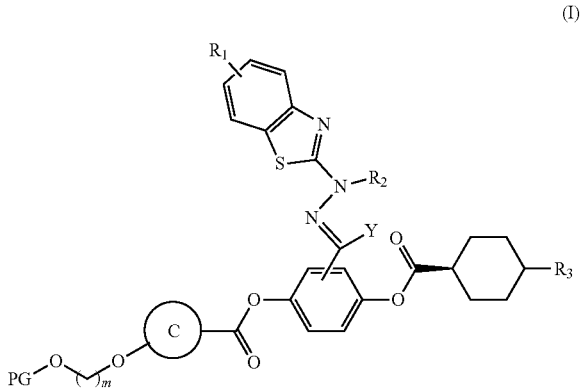

Further, the invention provides LCP mixtures comprising such compounds, LCP networks comprising said compounds or LCP mixture, the use of said compounds, LCP mixtures or LCP networks and optical or electro-optical devices comprising said compounds, LCP mixtures or LCP networks.

In the compounds of formula (I), $R_1$ is selected from the group consisting of hydrogen, $C_1$-$C_{12}$ straight or branched alkyl chain, $C_3$-$C_{12}$ alkenyl, $C_1$-$C_{12}$ alkoxy, $C_3$-$C_{12}$ alkenyloxy, —(CH$_2$)$_m$—C(CH$_3$)$_3$, NO$_2$, CN, COR, —COOR, —OCOR, —CONR'R, —NR'COR, OCOOR, —OCONR'R, —NR'COOR, —F, —Cl, —CF$_3$ and —OCF$_3$;

in which m is an integer between 0 and 12;

R is selected from the group consisting of hydrogen, an C$_{1-18}$ alkyl group, an C$_{3-16}$ alkenyl group with the double bond at 3-position or higher, —(CH$_2$)$_p$—C—(CF$_3$)$_3$, CN and unsubstituted or substituted phenyl ring, wherein the substituent of the phenyl ring is selected from the group consisting of C$_1$-C$_6$ straight or branched alkyl chain, C$_1$-C$_6$ alkoxy, —C—(CH$_3$)$_3$, halogen, —CF$_3$, NO$_2$, CN, COR", —COOR''', —OCOR'''—, —CONR"R''', —NR"COR''', OCOOR''', —OCONR"R''', —NR"COOR''', —F, —Cl, —CF$_3$ and —OCF$_3$;

in which

R" is selected from the group consisting of hydrogen, a lower alkyl group and a lower alkenyl group;

R''' is selected from the group consisting of hydrogen, an C$_{1-18}$ alkyl group and an C$_{3-18}$ alkenyl group with the double bond at 3-position or higher;

p is an integer between 0 and 12;

R' is selected from the group consisting of hydrogen, lower alkyl, lower alkenyl and lower alkoxy;

and in which n is 0, 1, 2 or 3.

Preferably, R$_1$ is selected from the group consisting of hydrogen, lower alkyl, lower alkenyl, lower alkoxy, lower alkenyloxy, —F and —CF$_3$.

Most preferably, R$_1$ is selected from the group consisting of H, methyl, methoxy, —F, —C—(CH$_3$)$_3$ and —CF$_3$.

R$_2$ is selected from the group consisting of hydrogen, a substituted or unsubstituted alkyl group having 1 to 20 carbon atoms, a substituted or unsubstituted alkenyl group having 2 to 20 carbon atoms, a substituted or unsubstituted cycloalkyl group having 3 to 12 carbon atoms, a substituted or unsubstituted alkynyl group having 2 to 20 carbon atoms, wherein one or more carbon atoms may be replaced by —O—, —COO—, —OCO—, —OOC—, —O(CO)O—, —N—, —NR$^a$—, —CON—, —CO—R$^b$, —NH—R$^c$, wherein R$^a$ is a C$_1$-C$_{12}$ alkyl group, R$^b$ and R$^c$ are independently from each other a substituted or unsubstituted alkyl group having 1 to 20 carbon atoms, or an organic group having 2 to 30 carbon atoms that includes at least one aromatic ring, or a substituted or unsubstituted alkenyl group having 2 to 20 carbon atoms, or a substituted or unsubstituted cycloalkyl group having 3 to 12 carbon atoms.

Preferably, R$_2$ is selected from the group consisting of hydrogen and substituted or unsubstituted alky group having 1 to 12 carbon atoms.

R$_3$ is selected from the group consisting of C$_1$-C$_{12}$ alkyl chain, C$_2$-C$_{12}$ alkenyl and —CN Preferably, R$_3$ is selected from C$_1$-C$_{12}$ alkyl chain or —CN—.

Y is selected from the group consisting of H, or substituted or unsubstituted alkyl group having 1 to 12 carbon atoms.

Ring C is selected from the group consisting of phenyl, biphenyl, naphthyl, cycloalkyl, preferably cyclohexyl, bicycloalkyl, preferably bicyclohexyl,

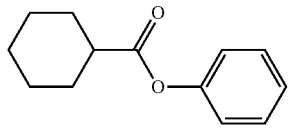

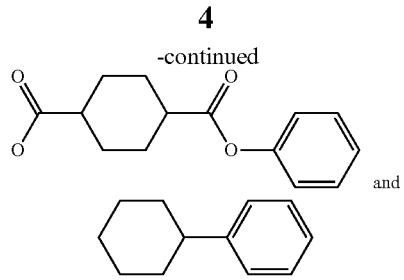

and m is a value between 1 and 24.

Preferably, ring C is a phenyl or a cyclohexyl.

More preferably, ring C is a phenyl.

Substituent PG in the group of formula (II) represents a polymerisable group selected from the group consisting of CH$_2$=C(Ph)—, CH$_2$=CW—COO—, CH$_2$=CH—COO—Ph—, CH$_2$=CW—CO—NH—, CH$_2$=CH—O—, CH$_2$=CH—OOC—, Ph—CH=CH—, CH$_2$=CH—Ph—, CH$_2$=CH—Ph—O—, R$^b$—Ph—CH=CH—COO—, R$^b$—OOC—CH=CH—Ph—O— and 2-W-epoxyethyl; in which W represents H, Cl, Ph or a lower alkyl and R$^b$ represents a lower alkyl with the proviso that when R$^b$ is attached to a phenylene group (—Ph—) it may also represent hydrogen or a lower alkoxy. Preferably, PG represents an acrylate or a methacrylate group.

By the term "lower alkyl" it should be understood to include a C$_{1-6}$ achiral, branched or straight-chained alkyl group. Examples of lower alkyl groups that may be present in the compounds of the invention include methyl, ethyl, propyl, butyl, pentyl, hexyl and the like.

By the term "lower alkenyl" it should be understood to include C$_{3-6}$ achiral, branched or straight-chained alkenyl group in which the double bond is at position 2- or higher. Examples of lower alkenyl groups that may be present in the compounds of the invention include 2-propenyl, 3-butenyl, 3-isopentenyl, 4-pentenyl, 5-hexenyl, 4-isohexenyl and the like.

By the term "lower alkoxy" it should be understood to include C$_{1-6}$ achiral, branched or straight-chained alkoxy group. Examples of lower alkoxy groups that may be present in the compounds of the invention include methoxy, ethoxy, propoxy, butoxy, pentoxy hexoxy and the like.

By the term "lower alkenyloxy" it should be understood to include C$_{3-6}$ achiral, branched or straight-chained alkenyloxy group in which the double bond is at position 2- or higher. Examples of lower alkenyloxy groups that may be present in the compounds of the invention include 2-propenyloxy, 3-butenyloxy, 4-pentenyloxy, 5-hexenyloxy and the like.

The polymerizable anisotropic LCP compounds of the invention may be readily prepared using procedures well known to a skilled person and few non-limiting procedures are provided in the examples.

The starting materials are commercially available or may be readily prepared and are well known to a skilled person.

A polymerizable anisotropic LCP compound material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer or by rubbing. Polymerization may be initiated by thermal treatment and/or by exposure to actinic light, which preferably comprises UVlight. An anisotropic LCP-material may comprise only a single type of liquid crystal compound, but may also comprise additional polymerizable and/or non-polymerizable compounds, wherein not all of the compounds have to be liquid crystal compounds. In case of optical films, anisotropic LCP monomers are applied on top of a photo-aligning layer or on top of a rubbed surface. After the alignment information of the photo-aligning layer or of the rubbed surface has been transferred to the LCP monomers, the monomers are polymerized and/or cross-linked in order to solidify the LCP material. It is understood that polymerized or crosslinked polymers according to the present invention may contain only anisotropic LCP compounds of formula (I) alone, and in this case the polymer is a homopolymer, or the polymerized or crosslinked polymers may contain further different monomers, and in this case the polymer is a copolymer. The further different monomer may or may not have LCP properties.

The anisotropic LCP compounds according to the present invention overcome the drawbacks described previously of the LCP compounds of the prior art. Further, the anisotropic LCP compounds according to the present invention have excellent solubility and low temperature processability. Preferably, anisotropic compounds of formula (I) of can be aligned (or annealed) at a temperature below 120° C.

A further object of the present invention relates to a composition, a LCP mixture, comprising an anisotropic compound of formula (I) and at least one solvent and/or additive. The additives can be selected from the following: antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, lubricating agents, dispersing agents, a polymeric binder and/or monomeric compounds which can be converted into the polymeric binder by polymerization, or, in the case of emulsion coatings and printing inks, a dispersion auxiliary, hydrophobing agents, adhesive agents, flow improvers, defoaming agents, deaerators, diluents, auxiliaries, colorants, dyes and pigments, curing inhibitors, a chiral additive, isotropic or anisotropic fluorescent and/or non-fluorescent dyes, in particular dichroic dyes. The solvent that may be used in the preparation of such liquid crystalline compositions include but not limited to acetone, cyclopentanone (CP), cyclohexanone (CH), methyl isobutyl ketone (MIBK), methylethylketone (MEK), N,N-dimethylformamide (DMF), N-methylpyrrolidone (NMP), M-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO). Most preferred solvents are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

A further preferred object of the present invention relates to a composition comprising the anisotropic LCP compound of formula (I), LCP mixture, and at least one solvent, selected from cyclohexanone, toluene and cyclopentanone; and/or an additive.

A further preferred embodiment of the present invention is a composition, a LCP mixture, comprising the anisotropic compound of formula (I), which preferably has a shelf life stability over more than 3 months with no crystallization. The present invention relates to an optical film comprising at least one of the anisotropic LCP compounds or compositions according to the present invention. An example of an optical film is a circular polarizer film used as an antireflective film that is produced by combining the optical film according to the present invention with a linear polarizer.

The anisotropic LCP compounds or the composition comprising the anisotropic LCP compounds can be applied on a support. The support may be rigid or flexible and can have any form or shape. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as microstructures like micro lenses or micro-prisms, or structures exhibiting abrupt changes of the shape, such as rectangular structures. Preferably, the support is transparent. The support may also have been subjected to a treatment before coating with the anisotropic LCP compound according to the present invention.

The support may be moving during the deposition of the anisotropic LCP compounds or the composition comprising the anisotropic LCP compounds. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free-standing film, without the support.

The support may have additional layers, such as photo-aligning layer, organic, dielectric or metallic layers. The layers can have different functions, for example an organic layer can be coated as a primer layer which increases compatibility of the materials to be coated with the support. Metallic layers may be used as electrodes, for example when used in electro-optical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a a polarizer, such as a polarizing film or a sheet polarizer, a reflective polarizer, such as the commercially available Vikuity™ DBEF film.

In the context of the present invention, a "photoaligning layer" is made of a material in which anisotropic properties, a photo-orientable substance, can be induced upon exposure to aligning light. In addition the term "photoaligning layer" refers to a layer that has been aligned by exposure to aligning light. For the present invention the induced anisotropy must be as such that it provides alignment capability for the adjacent layer comprising e.g. the anisotropic LCP compounds of formula (I). The term "alignment direction" shall refer to the preferred direction that is induced in the adjacent layer, for example the alignment direction is the direction in which the LCP compounds would be aligned.

Photo-orientable substances incorporate photo-orientable moieties, which are capable of developing a preferred direction upon exposure to aligning light and thus creating anisotropic properties. Such photo-orientable moieties preferably have anisotropic absorption properties. Typically, such moieties exhibit absorption within the wavelength range from 230 to 500 nm. Preferably, the photo-orientable moieties exhibit absorption of light in the wavelength range from 300 to 450 nm, more preferred are moieties, which exhibit absorption in the wavelength range from 310 to 380 nm.

Preferably the photo-orientable moieties have carbon-carbon, carbon-nitrogen, or nitrogen-nitrogen double bonds.

For example, photo-orientable moieties are substituted or un-substituted azo dyes, anthraquinone, coumarin, mericyanine, 2-phenylazothiazole, 2-phenylazobenzthiazole, stilbene, cyanostilbene, fluorostilbene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxycarboxylic derivatives, arylester, N-arylamide, polyimide, diaryl ketones, having a ketone moiety or ketone derivative in conjugation with two aromatic rings, such as for example substituted benzophenones, benzophenone imines, phenylhydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-orientable moieties comprise arylazo, poly(arylazo), stilbene, cyanostilbene, cinnamate or chalcone.

A photo-orientable substance may in particular be a monomer, a oligomer or a polymer. The photo-orientable moieties can, for example, be covalently bonded within the main chain or within a side chain of a polymer or oligomer or they may be part of a monomer or other compounds which are not polymerizable. A photo-orientable substance may further be a copolymer comprising different types of photo-orientable moieties or it may be a copolymer comprising side chains with and without photo-orientable moieties.

Polymers denotes for example to polyacrylate, polymethacrylate, polyimide, polyurethane, polyamic acids, polymaleinimide, poly-2-chloroacrylate, poly-2-phenylacrylate; unsubstituted or with $C_1$-$C_6$alkyl substituted poylacrylamide, polymethacyrlamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmethacrylates with alkyl residues of 1-20 carbon atoms; polyacrylnitril, polymethacrylnitril, cycloolephinic polymers, polystyrene, poly-4-methylstyrene or mixtures thereof.

A photo-orientable substance may also comprise photosensitizers, for example, ketocoumarines and benzophenones.

Further, preferred photo-orientable monomers or oligomers or polymers are described in U.S. Pat. Nos. 5,539,074, 6,201,087, 6,107,427, 6,632,909 and 7,959,990.

Alignment of the LCP can be achieved by any other known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush or rub the support or imprint a directional microstructure to generate alignment capability.

The steps of polymerizing the LCP compounds and exposure to aligning light may be in any sequence. Polymerization may be initiated before or after exposure to aligning light. Or polymerization and exposure may occur simultaneously.

A further embodiment of the present invention relates to a process for manufacturing an optical film comprising an anisotropic compound of formula (I), a LCP mixture or a LCP network according to the present invention, by exposure to aligning light, preferably by an energy of <200 mJ, more preferably of <150 mJ and more preferably <100 mJ.

The LCP mixture may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A further embodiment of the present invention is an optical film comprising an anisotropic compound of formula (I), or a LCP mixture, or a LCP network according to the present invention. Preferably, an optical film comprises the aligned anisotropic compound of formula (I), or a LCP mixture, or a LCP network. More preferred the alignment quality is uniform with no tilt domains.

In addition, preferred are optical films which have a high contrast ratio in the range of 500-1500 and more preferably in the range of 1500-3000 and most especially in >3000.

Further preferred are optical films comprising LCPs according to the present invention which show reverse retardation pattern of polarized light over a wide wavelength band. The optical films according to the present invention have preferably birefringence with reverse wavelength dispersion: $Re_{450}/Re_{550}$ is below 1.0, preferably $R_{450}/Re_{550}$ is <0.88 and more preferably <0.85.; whereas $Re_{650}/Re_{550}$ is above 1.0 , preferably $Re_{650}/Re_{550}$ is >1.01 and more preferably of ≥1.03. (The $Re_{450}$ represents the retardation of the film at a wavelength of 450 nm, $Re_{550}$ the retardation of the film at a wavelength of 550 nm and $Re_{650}$ the retardation of the film at a wavelength of 650 nm).

The invention will now be described with reference to the following non-limiting examples. These examples are provided by way of illustration only. Variations on these examples falling within the scope of the invention will be apparent to a skilled person.

EXAMPLES

Example 1

Synthesis of Compound 1

Synthesis of (3-formyl-4-hydroxy-phenyl) 4-methylcyclohexanecarboxylate, Compound 2

A solution of DCC (11.45 g, 0.055 mol) in 70 mL of dichloromethane was added dropwise to a cooled mixture of 2,5-dihydroxybenzaldehyde (7 g, 0.050 mol), trans-4-methylcyclohexanecarboxylic acid (7.5 g, 0.053 mol) and 4-dimethylaminopyridine (0.6 g, 0.005 mol) in 70 mL of dichloromethane. The reaction mixture was stirred at ambient temperature overnight. The mixture was filtered through Hyflo® super Cell® and the solution was concentrated under vacuum. The residue was dissolved in 130 mL of methanol and then the solution was cooled down to 0° C. The precipitate was filtered off and dried under vacuum at 40° C. to give 7.4 g of beige solid, compound 2.

Synthesis of [2-formyl-4-(4-methylcyclohexanecarbonyl)oxy-phenyl]4-(6-prop-2-enoyloxyhexoxy)benzoate, Compound 3

DCC (3.75 g, 0.018 mol) was added to a cooled mixture of compound 2 (3.95 g, 0.015 mol), 4-(6-prop-2-enoyloxyhexoxy)benzoic acid (5.5 g, 0.018 mol) and 4-dimethylaminopyridine (0.2 g, 0.0016 mol) in 70 mL of dichloromethane. The reaction mixture was stirred at ambient temperature overnight and was then filtered off through Hyflo® super Cell®. The resulting solution was concentrated under vacuum. The residue was dissolved in 100 mL of methanol and then the solution was cooled down to 0° C. The precipitate was filtered off and dried under vacuum at 40° C. to give 6.4 g of beige solid, compound 3.

Synthesis of [2-[(1, 3-benzothiazol-2-ylhydrazono)methyl]-4-(4-methylcyclohexanecarbonyl) oxy-phenyl]4-(6-prop-2-enoyloxyhexoxy)benzoate Compound 1

DL-10-camphorsulfonic acid (0.1 g, 0.0004 mol) was added to a yellow solution of compound 3 (1.9 g, 0.0035 mol) and 2-hydrazinobenzothiazole (0.7 g, 0.0042 mol) dissolved in 20 mL of THF. After 2 hours at room temperature, 30 mL of ethylacetate was added. The solution was then washed 4 times with a 5 wt % solution of sodium hydrogen carbonate, dried over sodium sulfate and concentrated under vacuum to give the 2.1 of compound 1 as a pale yellow powder.

$^1$H NMR (400 MHz, DMSO-d6) δ 12.30; (s, 1H), 8.15; (m, 3H), 7.74; (d,1H), 7.60; (d, 1H), 7.43; (m, 1H), 7.40; (d, 1H), 7.29; (m, 1H), 7.24; (m, 1H), 7.16; (d, 2H), 7.12; (m, 1H), 6.34; (dd, 1H), 6.20; (dd, 1H), 5.95; (d, 1H), 4.14; (m, 4H), 2.57; (tt, 1H), 2.10; (m, 2H), 1.86-1.29; (m, 13H), 1.06; (q, 2H), 0.93; (m, 3H).

Liquid crystal phase Transition: To determine its phase transition temperature, compound 1 was placed on a hot plate and was observed with a polarizing microscope under cross polarizers while the sample was heated at a rate of 5° C./min. As a result, the crystalline phase changed into a nematic phase at 147° C. ($T_{(cr-N)}$) and the isotropic phase ($T_{(N-I)}$) was not observed for a temperature below 160° C.

Example 2

Synthesis of Compound 4

Synthesis of (3-formyl-4-hydroxy-phenyl) 4-ethylcyclohexanecarboxylate, Compound 5

DCC (24.64 g g, 0.120 mol) was added to a mixture of 2,5-dihydroxybenzaldehyde (15 g, 0.109 mol), trans-4-ethylcyclohexanecarboxylic acid (17.8 g, 1.05 mol) and 4-dimethylaminopyridine (1.32 g, 0.1 mol) in 150 mL of dichloromethane. The reaction mixture was stirred at ambient temperature overnight. The mixture was filtered through Hyflo® super Cell®and the solution was concentrated under vacuum. The residue was further purified by flash column chromatography over silica gel using a 1:1 mixture of hexane/ethylacetate. The compound 5 was obtained as a white solid (30.35 g).

Synthesis of [4-(4-ethylcyclohexanecarbony)oxy-2-formyl-phenyl]4-(6-prop-2-enoyloxyhexoxy)benzoate, Compound 6

DCC (8.2 g, 0.0398 mol) was added to a cooled mixture of compound 5 (10.0 g, 0.0362 mol), 4-(6-prop-2-enoyloxyhexoxy)benzoic acid (11.6 g, 0.0398 mol) and 4-dimethylaminopyridine (0.442 g, 0.0037 mol) in 100 mL of dichloromethane. The reaction mixture was stirred at ambient temperature overnight. The solution was then filtered off through Hyflo® super Cell® and concentrated under vacuum. The residue was further purified by flash column chromatography over silica gel using a 4:1 mixture of hexane/ethylacetate to give 17.66 g of solid compound 6.

Synthesis of [2-[(1,3-benzothiazol-2-ylhydrazono)methyl]-4-(4-ethylcyclohexanecarbonyl)oxy-phenyl]4-(6-prop-2-enoyloxyhexoxy)benzoate, Compound 4

DL-10-camphorsulfonic acid (0.304 g, 0.0013 mol) was added to a yellow solution of compound 6 (7.2 g, 0.0131 mol) and 2-hydrazinobenzothiazole (2.59 g, 0.0157 mol) dissolved in 70 ml of THF. The mixture was stirred at room temperature overnight. After addition of ethylacetate, the solution was washed with a 5 wt % solution of sodium hydrogen carbonate, dried over sodium sulfate and concentrated under vacuum. 9.5 g of compound 4 was obtained as a solid after recrystallization from acetonitrile.

$^1$H NMR (400 MHz, DMSO-d6) δ: 12.31; (s, 1H), 8.16; (m, 3H), 7.73; (d,1H), 7.60; (d, 1H), 7.41; (m, 2H), 7.24; (m, 2H), 7.14; (m, 3H), 6.34; (d, 1H), 6.18; (dd, 1H), 5.94; (d, 1H), 4.12; (m, 4H), 2.59; (tt, 1H), 2.13; (d, 2H), 1.82; (m, 4H), 1.67; (qt, 2H), 1.46; (m, 6H), 1.23; (m, 3H), 1.04; (m, 2H), 0.89; (t, 3H).

Liquid crystal phase transition: $T_{(Cr-N)}$: 141° C., $T_{(N-I)}$: 143° C.

Example 3

Synthesis of Compound 7

Synthesis of (3-formyl-4-hydroxy-phenyl) 4-buthylcyclohexanecarboxylate, compound 8

The compound 8 was prepared according to the process described in example 1 for compound 2 except that trans-4-methylcyclohexanecarboxylic acid was replaced by trans-4-buthylcyclohexanecarboxylic acid.

Synthesis of [4-(4-butylcyclohexanecarbonyl)oxy-2-formyl-phenyl]4-(6-prop-2-enoyloxyhexoxy)benzoate, Compound 9

The compounds 9 was prepared according to the process described in example 1 for compound 3 except that the compound 2 was replaced by the compound 8.

Synthesis of [2-[(1,3-benzothiazol-2-ylhydrazono)methyl]-4-(4-butylcyclohexanecarbonyl)oxy-phenyl]4-(6-prop-2-enoyloxyhexoxy)benzoate, Compound 7

The compounds 7 was prepared according to the process described in example 1 for compound 1 except that the compound 3 was replaced by the compound 9.

$^1$H NMR (400 MHz, DMSO-d6) δ: 12.31; (s, 1H), 8.16; (m, 3H), 7.73; (d,1H), 7.60; (d, 1H), 7.41; (m, 2H), 7.25; (m, 2H), 7.14; (m, 3H), 6.34; (d, 1H), 6.18; (dd, 1H), 5.94; (d, 1H), 4.13; (m, 4H), 2.58; (tt, 1H), 2.13; (d, 2H), 1.81; (m, 4H), 1.66; (qt, 2H), 1.55-0.9 (m, 15H), 0.89 (t, 3H).

Liquid crystal phase transition: $T_{(Cr-N)}$: 141° C., $T_{(N-I)}$: 166° C.

Example 4

Synthesis of Compound 10

Synthesis of 1-(1,3-benzothiazol-2-yl)-1-hexyl-hydrazine, Compound 11

A four-necked reactor was charged with 2-hydrazinobenzothiazole (3.5 g, 0.020 mol) and 20 mL of DMF. NaOH (1.25 g, 0.030 mol) was slowly added under a nitrogen stream. After the addition of 1-Bromohexane (4.05 g, 0.024 mol), the mixture was heated to 60° C. for 4 hours. After the completion of the reaction, the reaction mixture was cooled down to 25° C. and added to 200 mL of water and 100 mL of heptane. The precipitate was filtered off to give 2.45 g of compound 11 as a white solid.

Synthesis of [2-[(1, 3-benzothiazol-2-yl(hexyl)hydrazono)methyl]-4-(4-ethylcyclohexanecarbonyl)oxy-phenyl] 4-(6-prop-2-enoyloxyhexoxy)benzoate, Compound 10

DL-10-camphorsulfonic acid (0.30 g, 0.0013 mol) was added to a yellow solution of compound 6 (3.7 g, 0.00673 mol) and compound 11 (2 g, 0.008 mol) dissolved in 50 mL of THF. The mixture was stirred at room temperature overnight. After addition of ethylacetate, the solution was washed with a 5 wt % solution of sodium hydrogen carbonate, dried over sodium sulfate and concentrated under vacuum. 4.8 g of compound 10 was obtained as a solid after recrystallization from methanol.

$^1$H NMR (400 MHz, DMSO-d6) δ: 8.18; (d, 2H), 7.83; (m,2H), 7.59; (m, 2H), 7.43; (d, 1H), 7.29; (m, 2H), 7.16; (m, 3H), 6.34; (d, 1H), 6.17; (dd, 1H), 5.95; (d, 1H), 4.23; (m, 2H), 4.12; (m, 4H), 2.62; (tt, 1H), 2.13; (d, 2H), 2.00-0.80; (m, 28H), 0.73; (t, 3H).

Liquid crystal phase transition: $T_{(Cr-N)}$: 106° C., $T_{(N-I)}$: 108° C.

Example 5

Synthesis of Compound 12

Synthesis of [2-[(1,3-benzothiazol-2-yl(hexyl)hydrazono)methyl]-4-(4-methylcyclohexanecarbonyl)oxy-phenyl]4-(6-prop-2-enoyloxyhexoxy)benzoate Compound 12

The compounds 12 was prepared according to the process described in example 4 for compound 10 except that the compound 6 was replaced by the compound 3.

$^1$H NMR (400 MHz, DMSO-d6) δ: 8.17; (d, 2H), 7.83 (m,2H), 7.60; (m, 2H), 7.43; (d, 1H), 7.29; (m, 2H), 7.15; (m, 3H), 6.34; (d, 1H), 6.19; (dd, 1H), 5.94; (d, 1H), 4.21; (m, 2H), 4.13; (m, 4H), 2.58; (tt, 1H), 2.11; (d, 2H), 1.90-1.25; (m, 15H), 1.20-0.85; (m, 11H), 0.73; (t, 3H).

Liquid crystal phase transition: $T_{(Cr-N)}$: 94° C., $T_{(N-I)}$: 96° C.

Example 6

Synthesis of Compound 13

Synthesis of [2-[(1,3-benzothiazol-2-yl(hexyl)hydrazono)methyl]-4-(4-butylcyclohexanecarbonyl)oxy-phenyl]4-(6-prop-2-enoyloxyhexoxy)benzoate Compound 13

The compounds 13 was prepared according to the process described in example 4 for compound 10 except that the compound 6 was replaced by the compound 9.

$^1$H NMR (400 MHz, DMSO-d6) δ: 8.15; (d, 2H), 7.81; (m, 2H), 7.58; (m, 2H), 7.42; (d, 1H), 7.32; (t, 1H), 7.25; (dd, 1H), 7.14; (m, 3H), 6.334; (dd, 1H), 6.18; (dd, 1H), 5.93; (d, 1H), 4.19; (t, 2H), 4.12 (m, 4H), 2.58; (tt, 1H), 2.12; (d, 2H), 1.92-0.80; (m, 32H), 0.72; (t, 3H).

Liquid crystal phase transition: $T_{(Cr-N)}$: 88° C., $T_{(N-1)}$: 92° C.

Example 7

Synthesis of Compound 14

Synthesis of ((3-formyl-4-hydroxy-phenyl) 4-heptylcyclohexanecarboxylate Compound 15

The compound 15 was prepared according to the process described in example 1 for compound 2 except that trans-4-methylcyclohexanecarboxylic acid was replaced by trans-4-hepthylcyclohexanecarboxylic acid.

Synthesis of [4-(4-heptylcyclohexanecarbonyl)oxy-2-formyl-phenyl]4-(6-prop-2-enoyloxyhexoxy)benzoate, Compound 16

The compound 16 was prepared according to the process described in example 1 for compound 3 except that the compound 2 was replaced by the compound 15.

Synthesis of [2-[(1,3-benzothiazol-2-yl(hexyl)hydrazono)methyl]-4-(4-heptylcyclohexanecarbonyl)oxy-phenyl]4-(6-prop-2-enoyloxyhexoxy)benzoate Compound 14

The compound 14 was prepared according to the process described in example 4 for compound 10 except that the compound 6 was replaced by the compound 16.

$^1$H NMR (400 MHz, CDCl$_3$) δ: 8.15; (d, 2H), 7.73; (d, 1H), 7.71; (s, 1H), 7.63; (t, 2H), 7.30; (t, 1H), 7.19; (d, 1H), 7.13; (m, 2H), 6.96; (d, 2H), 6.45; (dd, 1H), 6.12; (dd, 1H), 5.81; (d, 1H), 4.17; (m, 4H), 4.03; (t, 2H), 2.52; (tt, 1H), 2.18; (d, 2H), 1.98-0.91; (m, 35H), 0.87; (t, 3H), 0.76; (t, 3H).

Liquid crystal phase transition: $T_{(Cr-N)}$: 96° C., $T_{(N-1)}$: 96.5° C.

Example 8

Synthesis of Compound 17

Synthesis of [4-(4-ethylcyclohexanecarbonyl)oxy-2-[(6-methoxy-1,3-benzothiazol-2-yl)hydrazonomethyl]phenyl] 4-(6-prop-2-enoyloxyhexoxy)benzoate Compound 17

The compound 17 was prepared according to the process described in example 2 for compound 4 except that the 2-hydrazinobenzothiazole was replaced by the (6-methoxy-1,3-benzothiazol-2-yl)hydrazine.

$^1$H NMR (400 MHz, DMSO-d6) δ: 12.19; (s, 1H), 8.14; (m, 3H), 7.58; (d, 1H), 7.37; (m, 3H), 7.23; (dd, 1H), 7.17; (d, 2H), 6.90; (dd, 1H), 6.33; (dd, 1H), 6.18; (dd, 1H), 5.94; (d, 1H), 4.13; (m, 4H), 3.77; (s, 3H), 2.59; (tt, 1H), 2.14; (d, 2H), 1.91-0.94; (m, 17H), 0.90; (t, 3H).

Liquid crystal phase transition: $T_{(Cr-N)}$: 165° C., $T_{(N-I)}$: 166.5° C.

Example 9

Synthesis of Compound 18

Synthesis of [4-(4-ethylcyclohexanecarbonyl)oxy-2-[6-fluoro-1,3-benzothiazol-2-yl)hydrazonomethyl]phenyl] 4-(6-prop-2-enoyloxyhexoxy)benzoate Compound 18

The compound 18 was prepared according to the process described in example 2 for compound 4 except that the 2-hydrazinobenzothiazole was replaced by the (6-fluoro-1,3-benzothiazol-2-yl)hydrazine.

¹H NMR (400 MHz, DMSO-d6) δ 12.36; (s, 1H), 8.14; (m, 3H), 7.69; (d, 1H), 7.59; (d, 1H), 7.46; (m, 1H), 7.40; (d, 1H), 7.25; (dd, 1H), 7.16; (m, 3H), 6.33; (dd, 1H), 6.18; (dd, 1H), 5.94; (d, 1H), 4.13; (m, 4H), 2.59; (tt, 1H), 2.13; (d, 2H), 1.91-0.94; (m, 17H), 0.90; (t, 3H).

Liquid crystal phase transition: $T_{(Cr-N)}$: 156° C., $T_{(N-I)}$>160° C.

Example 10

Synthesis of Compound 19

Synthesis of 1-(1,3-benzothiazol-2-yl)-1-dodecyl-hydrazine Compound 20

A four-necked reactor was charged with 2-hydrazinobenzothiazole (3.30 g, 0.020 mol) and 50 mL of DMF. NaOH (1.25 g, 0.030 mol) was slowly added under a nitrogen stream. After the addition of 1-bromododecane (5.30 ml, 0.022 mol), the mixture was allowed to stirred for 2 hours. After the completion of the reaction, the reaction mixture was poured to 150 mL of water and 100 mL to heptane. The precipitate was recovered by filtration to give 1.80 g of compound 20 as a solid.

Synthesis of [2-[1,3-benzothiazol-2-yl(dodecyl)hydrazono]methyl]-4-(4-butylcyclohexanecarbonyl)oxy-phenyl] 4-(6-prop-2-enoyloxyhexoxy)benzoate Compound 19

The compound 19 was prepared according to the process described in example 4 for compound 10 except that compound 11 was replaced by the compound 20.

¹H NMR (400 MHz, DMSO-d6) δ 8.17; (d, 2H), 7.83; (m, 2H), 7.60; (m, 2H), 7.44; (d, 1H), 7.31; (m, 2H), 7.15; (m, 3H), 6.33; (dd, 1H), 6.18; (dd, 1H), 5.95; (dd, 1H), 4.22; (t, 2H), 4.13; (m, 4H), 2.60; (tt, 1H), 2.13; (d, 2H), 1.92-0.78; (m, 47H).

Liquid crystal phase transition: $T_{(Cr-N)}$: 73.7° C., $T_{(N-I)}$: 79.3° C.

Example 11

Synthesis of Compound 21

Synthesis of 1-(1,3-benzothiazol-2-yl)-1-ethyl-hydrazine Compound 22

The compound 12 was prepared according to the process described in example 10 for compound 20 except that 1-bromododecane was replaced by 1-bromoethane.

Synthesis of [2-[1,3-benzothiazol-2-yl(ethyl)hydrazonomethyl]-4-(4-butylcyclohexanecarbonyl)oxy-phenyl]4-(6-prop-2-enoyloxyhexoxy)benzoate Compound 21

The compound 21 was prepared according to the process described in example 4 for compound 10 except that the compound 11 was replaced by the compound 22.

¹H NMR (400 MHz, DMSO-d6) δ 8.15; (d, 2H), 7.94; (s, 1H), 7.76; (d, 1H), 7.60; (m, 2H), 7.42; (d, 1H), 7.33; (t, 1H), 7.25; (dd, 1H), 7.15; (m, 3H), 6.33; (dd, 1H), 6.18; (dd, 1H), 5.93; (dd, 1H), 4.30; (q, 2H), 4.11; (m, 4H), 2.59; (tt, 1H), 2.12; (d, 2H), 1.90-1.14; (m, 17H), 1.06; (t, 3H), 0.88; (t, 3H).

Liquid crystal phase transition: $T_{(Cr-N)}$: 100.5° C., $T_{(N-I)}$: 102° C.

Example 12

Synthesis of Compound 23

Synthesis of [4-(4-ethylcyclohexanecarbonyl)oxy-2-formyl-phenyl] 4-(10-prop-2-enoyloxydecoxy)benzoate Compound 24

The compound 24 was prepared according to the process described in example 4 for compound 6 except that 4-(6-prop-2-enoyloxyhexoxy)benzoic acid was replaced by 4-(10-prop-2-enoyloxydecoxy)benzoic acid Synthesis of [2-[[1,3-benzothiazol-2-yl(hexyl)hydrazono]methyl]-4-(4-ethylcyclohexanecarbonyl)oxy-phenyl]4-(10-prop-2-enoyloxydecoxy)benzoate Compound 23

The compound 23 was prepared according to the process described in example 4 for compound 10 except that the compound 6 was replaced by the compound 24.

¹H NMR (400 MHz, DMSO-d6) δ 8.15; (d, 2H), 7.83; (s, 1H), 7.79; (d, 1H), 7.58; (m, 2H), 7.41; (d, 1H), 7.32; (t, 1H), 7.25; (dd, 1H), 7.13; (m, 3H), 6.31; (dd, 1H), 6.16; (dd, 1H), 5.92; (dd, 1H), 4.19; (t, 2H), 4.09; (m, 4H), 2.58; (tt, 1H), 2.12; (d, 2H), 1.92-0.82; (m, 36H), 0.72; (t, 3H).

Liquid crystal phase transition: $T_{(Cr-N)}$: 86° C., $T_{(N-I)}$: 95° C.

Example 13

Synthesis of Compound 25

Synthesis of 1-hexyl-1-(6-methyl-1,3-benzothiazol-2-yl) hydrazine Compound 26

The compound 26 was prepared according to the process described in example 4 for compound 11 except that the 2-hydrazinobenzothiazole was replaced by the (6-methyl-1, 3-benzothiazol-2-yl)hydrazine.

Synthesis of [4-(4-butylcyclohexanecarbonyl)oxy-2-[hexyl-(6-methyl-1,3-benzothiazol-2-yl)hydrazonomethyl] phenyl]4-(6-prop-2-enoyloxyhexoxy)benzoate Compound 25

The compound 25 was prepared according to the process described in example 6 for compound 13 except that the compound 11 was replaced by the compound 26.

¹H NMR (400 MHz, DMSO-d6) δ 8.16; (d, 2H), 7.83; (s, 1H), 7.58; (m, 2H), 7.46; (m, 2H), 7.25; (d, 1H), 7.14; (m, 3H), 6.33; (dd, 1H), 6.17; (dd, 1H), 5.95; (dd, 1H), 4.19; (t, 2H), 4.11; (m, 4H), 2.60; (m, 1H), 2.13; (d, 2H), 1.95-0.80; (m, 35H), 0.72; (t, 3H).

Liquid crystal phase transition: $T_{(Cr-N)}$: 107° C., $T_{(N-I)}$: 109° C.

Example 14

Synthesis of Compound 26

Synthesis of 4-[4-(6-prop-2-enoyloxyhexoxy)phenoxy] carbonylcyclohexanecarboxylic Acid Compound 27

EDC (28.45 g, 0.134 mol) was added to a mixture of trans-cyclohexane-1,4-dicarboxylic acid (34.5 g, 2.0 mol), 350 mL of dichloromethane, 4-(6-prop-2-enoyloxyhexoxy) benzoic acid (17.65 g, 0.0668 mol) and 4-dimethylaminopyridine (0.816 g, 0.0067 mol). After 12 h, the reaction mixture was stopped, diluted with 200 mL of acetonitrile and filtered off Hyflo® super Cell®. The filtrate was concentrated under vacuum. The solid was then successively recrystallized in methanol and in a mixture of ethanol/water (1/1) to give 9.90 g of compound 27 as a white solid.

Synthesis of O4-[4-(4-ethylcyclohexanecarbonyl)oxy-3-formyl-phenyl]O1-[4-(6-prop-2-enoyloxyhexoxy)phenyl] cyclohexane-1,4-dicarboxylate Compound 28

DCC (1.92 g, 0.018 mol) was added to a mixture of compound 5 (2.34 g, 0.0085 mol), compound 27 (3.9 g, 0.0093 mol) and 4-dimethylaminopyridine (0.114 g, 0.00085 mol) in 25 mL of dichloromethane. The reaction mixture was stirred at ambient temperature overnight and was then filtered off through Hyflo® super Cell®. The resulting solution was concentrated under vacuum. The residue was purified by recrystallization in methanol to give 4.9 g of solid, compound 28.

Synthesis of O4-[2-[(1,3-benzothiazol-2-ylhydrazono) methyl-4-(4-ethylcyclohexanecarbonyl)oxy-phenyl]O1-[4-(6-prop-2-enoyloxyhexoxy)phenyl]cyclohexane-1,4-dicarboxylate Compound 26.

The compound 26 was prepared according to the process described in example 2 for compound 4 except that the compound 6 was replaced by the compound 28.

$^1$H NMR (400 MHz, DMSO-d6) δ 12.30; (s, 1H), 8.14; (m, 3H), 7.73 (d, 1H), 7.60; (d, 1H), 7.43; (m, 1H), 7.40; (d, 1H), 7.27 ;(m, 2H), 7.15; (m, 3H), 6.33; (dd, 1H), 6.1;7 (dd, 1H), 5.93; (dd, 1H), 4.10; (m, 4H), 2.59; (tt, 1H), 2.13; (d, 2H), 1.91-0.93; (m, 27H), 0.90; (t, 3H).

Liquid crystal phase transition: $T_{(Cr-N)}$: 98° C., $T_{(N-I)}$: 142° C.

Example 15

Synthesis of Compound 29

Synthesis of (3-formyl-4-hydroxy-phenyl) 4-(6-prop-2-enoyloxyhexoxy)benzoate Compound 30

DCC (9.2 g, 0.044 mol) was added to a mixture of 2,5-dihydroxybenzaldehyde (5.85 g, 0.042 mol), 4-(6-prop-2-enoyloxyhexoxy)benzoic acid (12.3 g, 0.040 mol) and 4-dimethylaminopyridine (0.5 g, 0.004 mol) in 120 ml of dichloromethane. The reaction mixture was stirred at ambient temperature overnight and was then filtered off through Hyflo® super Cell®. The resulting solution was concentrated under vacuum. The residue was washed with 150 mL of methanol and then dried under vacuum to give 17.5 g of compound 30 as a brown solid.

Synthesis of [4-(4-ethylcyclohexanecarbonyl)oxy-3-formyl-phenyl]4-(6-prop-2-enoyloxyhexoxy)benzoate Compound 31

DCC (4.6 g, 0.022 mol) was added dropwise to a mixture of compound 30 (8.7 g, 0.020 mol), trans-4-ethylcyclohexanecarboxylix acid (3.6 g, 0.022 mol) and 4-dimethyl-aminopyridine (0.25 g, 0.002 mol) in 80 mL of dichloromethane. The reaction mixture was let stirring at room temperature for 24 h. The mixture was filtered through Hyflo® super Cell®and the solution was concentrated under vacuum. The residue was purified by recrystallization in methanol to give 3.6 g of the compound 31 as a white solid.

Synthesis of [3-[(1,3-benzothiazol-2-ylhydrazono) methyl]-4-(4-ethylcyclohexanecarbonyl)oxy-phenyl]4-(6-prop-2-enoyloxyhexoxy)benzoate Compound 29

The compound 29 was prepared according to the process described in example 2 for compound 4 except that the compound 6 was replaced by the compound 31.

$^1$H NMR (400 MHz, DMSO-d6) δ 12.50; (s, 1H), 8.10; (m, 3H), 7.73; (m, 2H), 7.46; (m, 1H), 7.30; (m, 3H), 7.13; (m, 3H), 6.33; (dd, 1H), 6.17; (dd, 1H), 5.93; (dd, 1H), 4.13; (m, 4H), 2.63; (tt, 1H), 2.17; (d, 2H), 1.94-0.93; (m, 17H), 0.89; (t, 3H).

Liquid crystal phase transition: $T_{(Cr-N)}$: 137° C., $T_{(N-I)}$>150° C.

Example 16

Synthesis of Compound 32

Synthesis of [3-[1,3-benzothiazol-2-yl(hexyl)hydrazonomethyl]-4-(4-ethylcyclohexanecarbonyl)oxy-phenyl]4-(6-prop-2-enoyloxyhexoxy)benzoate Compound 32

The compound 32 was prepared according to the process described in example 4 for compound 10 except that the compound 6 was replaced by the compound 31.

$^1$H NMR (400 MHz, DMSO-d6) δ 8.12; (m, 2H), 7.81; (t, 2H), 7.71; (d, 1H), 7.61; (d, 1H), 7.33; (m, 3H), 7.15; (m, 3H), 6.33; (dd, 1H), 6.17; (dd, 1H), 5.93; (dd, 1H), 4.33; (m, 2H), 4.12; (m, 4H), 2.68; (tt, 1H), 2.17; (d, 2H), 1.91-0.93; (m, 25H), 0.88; (m, 6H).

Liquid crystal phase transition: $T_{(Cr-N)}$: 145° C., $T_{(N-I)}$>150° C.

Example 17

Synthesis of Compound 33

Synthesis of [4-(4-methylcyclohexanecarbonyl)oxy-3-formyl-phenyl]4-(6-prop-2-enoyloxyhexoxy)benzoate Compound 34

The compound 34 was prepared according to the process described in example 15 for compound 31 except that the trans-4-ethylcyclohexanecarboxylic acid was replaced by the trans-4-methylcyclohexanecarboxylic acid.

Synthesis of [3-[1,3-benzothiazol-2-yl)hydrazonomethyl]-4-(4-methylcyclohexanecarbonyl)oxy-phenyl]4-(6-prop-2-enoyloxyhexoxy)benzoate Compound 33

The compound 33 was prepared according to the process described in example 15 for compound 29 except that the compound 31 was replaced by the compound 34.

$^1$H NMR (400 MHz, DMSO-d6) δ 12.50; (s, 1H), 8.10; (m, 3H), 7.73; (m, 2H), 7.46; (m, 1H), 7.30; (m, 3H), 7.13; (m, 3H), 6.33; (dd, 1H), 6.17; (dd, 1H), 5.93; (dd, 1H), 4.13; (m, 4H), 2.62; (tt, 1H), 2.15; (d, 2H), 1.87-1.3; (m, 13H), 1.05; (q, 2H), 0.92; (d, 3H).

Liquid crystal phase transition: $T_{(Cr-N)}$: 132° C., $T_{(N-I)}$: 155° C.

Example 18

Synthesis of Compound 35

Synthesis of [3-[1,3-benzothiazol-2-yl(hexyl)hydrazonomethyl]-4-(4-methylcyclohexanecarbonyl)oxy-phenyl] 4-(6-prop-2-enoyloxyhexoxy)benzoate Compound 35

The compound 35 was prepared according to the process described in example 16 for compound 32 except that the compound 31 was replaced by the compound 34.

$^1$H NMR (400 MHz, DMSO-d6) δ 8.13; (m, 2H), 7.82; (, 2H), 7.72; (d, 1H), 7.62; (d, 1H), 7.33; (m, 3H), 7.15; (m, 3H), 6.33; (dd, 1H), 6.17; (dd, 1H), 5.94; (dd, 1H), 4.33; (t, 2H), 4.12; (m, 4H), 2.67; (tt, 1H), 2.17; (d, 2H), 1.91-0.94; (m, 23H), 0.88; (m, 6H).

Liquid crystal phase transition: $T_{(Cr-N)}$: 133.5° C., $T_{(N-I)}$: 137° C.

Example 19

Synthesis of Compound 36

Synthesis of [4-(4-ethylcyclohexanecarbonyl)oxy-3-formyl-phenyl]4-[6-(2-methylprop-2-enoyloxy)hexoxy] benzoate Compound 37.

The compound 37 was prepared to the process described in example 2 for compound 6 except that 4-(6-prop-2-enoyloxyhexoxy)benzoic acid is replaced by 4-[6-(2-methylprop-2-enoyloxy)hexoxy]benzoic acid.

Synthesis of [2-[1,3-benzothiazol-2-yl(hexyl)hydrazonomethyl]-4-(4-ethylcyclohexanecarbonyl)oxy-phenyl]4-[6-(2-methylprop-2-enoyloxy)hexoxy]benzoate Compound 36

The compound 36 was prepared according to the process described in example 4 for compound 10 except that the compound 16 was replaced by the compound 37.

$^1$H NMR (400 MHz, DMSO-d6) δ: 8.15; (d, 2H), 7.81; (m, 2H), 7.58; (m, 2H), 7.42; (d, 1H), 7.30; (m, 2H), 7.15; (m, 3H), 6.09; (s, 1H), 6.18; (dd, 1H), 6.65; (s, 1H), 4.21; (t, 2H), 4.12; (m, 4H), 2.58; (tt, 1H), 2.12; (d, 2H), 1.95-0.85; (m, 31H), 0.78; (t, 3H).

Liquid crystal phase transition: $T_{(Cr-N)}$: 101° C., $T_{(N-I)}$: 103° C.

Example 20

Synthesis of Compound 38

Synthesis of 1-(5-fluoro-1,3-benzothiazol-2-yl)-1-hexyl-hydrazine Compound 39

The compound 39 was prepared according to the process described in example 4 for compound 10 except that 2-hydrazinobenzothiazole was replaced by (5-fluoro-1,3-benzothiazol-2-yl) hydrazine.

Synthesis of [4-(4-butylcyclohexanecarbony0oxy-2-[(E)-[(5-fluoro-1,3-benzothiazol-2-yl)-hexyl-hydrazono]methyl]phenyl]4-(6-prop-2-enoyloxyhexoxy)benzoate Compound 39.

The compounds 38 was prepared according to the process described in example 6 for compound 13 except that the compound 11 was replaced by the compound 39.

$^1$H NMR (400 MHz, DMSO-d6) δ: 8.15; (d, 2H), 7.85; (s, 1H), 7.72; (d, 1H), 7.52; (m, 2H), 7.38; (d, 1H), 7.28; (m, 1H), 7.28; (m, 3H), 6.32; (dd, 1H), 6.20; (dd, 1H), 5.93; (d, 1H), 4.19; (m, 6H), 2.58; (tt, 1H), 2.12; (d, 2H), 1.92-0.80; (m, 32H), 0.72; (t, 3H).

Liquid crystal phase transition: $T_{(Cr-N)}$: 117° C., $T_{(N-I)}$: 119.5° C.

Example 21

Synthesis of Compound 40

Synthesis of 1-hexyl-1-(6-methoxy-1,3-benzothiazol-2-yl)hydrazine Compound 41

The compound 41 was prepared according to the process described in example 4 for compound 10 except that 2-hydrazinobenzothiazole was replaced by (6-methoxy-1,3-benzothiazol-2-yl) hydrazine.

Synthesis of [4-(4-butylcyclohexanecarbonyl)oxy-2-[hexyl-(6-methoxy-1,3-benzothiazol-2-yl)hydrazonomethyl]phenyl]4-(6-prop-2-enoyloxyhexoxy)benzoate Compound 40

The compounds 40 was prepared according to the process described in example 6 for compound 13 except that the compound 11 was replaced by the compound 41.

$^1$H NMR (400 MHz, DMSO-d6) δ: 8.17; (d, 2H), 7.79; (s, 1H), 7.58; (d, 1H), 7.45; (d, 1H), 7.41; (m, 2H), 7.21; (dd, 1H), 7.15; (d, 2H), 6.94; (d, 1H), 6.31; (dd, 1H), 6.18; (dd, 1H), 5.95; (d, 1H), 4.15; (m, 6H), 3.79; (s, 3H), 2.58; (tt, 1H), 2.12; (d, 2H), 1.95-0.80; (m, 32H), 0.72; (t, 3H).

Liquid crystal phase transition: $T_{(Cr-N)}$: 112° C., $T_{(N-I)}$: 114° C.

Example 22

Synthesis of Compound 42

Synthesis of 1-hexyl-1-(4-methoxy-1,3-benzothiazol-2-yl)hydrazine compound 43 The compound 41 was prepared according to the process described in example 4 for compound 10 except that 2-hydrazinobenzothiazole was replaced by (4-methoxy-1,3-benzothiazol-2-yl) hydrazine Synthesis of [4-(4-butylcyclohexanecarbonyl)oxy-2-[hexyl-(4-methoxy-1,3-benzothiazol-2-yl)hydrazonomethyl]phenyl]4-(6-prop-2-enoyloxyhexoxy)benzoate Compound 42.

The compounds 42 was prepared according to the process described in example 6 for compound 13 except that the compound 11 was replaced by the compound 43.

$^1$H NMR (400 MHz, DMSO-d6) δ: 8.15; (d, 2H), 7.78 (s, 1H), 7.55; (d, 1H), 7.38; (t, 2H), 7.25; (m, 1H), 7.18; (m, 3H), 6.91; (d, 1H), 6.33; (dd, 1H), 6.20; (dd, 1H), 5.91; (d, 1H), 4.19; (m, 6H), 3.89; (s, 3H), 2.57; (tt, 1H), 2.10; (d, 2H), 1.90-0.80; (m, 32H), 0.75; (t, 3H).

Liquid crystal phase transition: $T_{(Cr-N)}$: 94° C., $T_{(N-I)}$: 112° C.

Example 23

Synthesis of Compound 44

Synthesis of [1-hexyl-1-(4-methyl-1,3-benzothiazol-2-yl) hydrazine compound 45

The compound 45 was prepared according to the process described in example 4 for compound 10 except that 2-hydrazinobenzothiazole was replaced by (4-methyl-1,3-benzothiazol-2-yl)hydrazine.

Synthesis of [4-(4-butylcyclohexanecarbonyl)oxy-2-[hexyl-(4-methyl-1,3-benzothiazol-2-yl)hydrazonomethyl]phenyl]4-(6-prop-2-enoyloxyhexoxy)benzoate Compound 44.

The compounds 44 was prepared according to the process described in example 6 for compound 13 except that the compound 11 was replaced by the compound 45.

$^1$H NMR (400 MHz, DMSO-d6) δ: 8.15; (d, 2H), 7.81; (s, 1H), 7.58; (m, 2H), 7.42; (d, 1H), 7.32; (d, 1H), 7.25; (m, 3H), 7.14; (m, 1H), 6.33; (dd, 1H), 6.18; (dd, 1H), 5.93; (d, 1H), 4.19; (t, 2H), 4.12; (m, 4H), 2.58; (tt, 1H), 2.12; (d, 2H), 1.92-1.00; (m, 32H), 0.9; (t, 3H), 0.72; (t, 3H).

Liquid crystal phase transition: $T_{(Cr-N)}$: 86° C., $T_{(N-I)}$: 105° C.

Example 24

Synthesis of Compound 46

Synthesis of 6-[amino(1,3-benzothiazol-2-y0amino] hexan-1-ol Compound 47.

The compound 47 was prepared according to the process described in example 4 for compound 10 except that 6-bromohexane was replaced by 6-bromohexan-1-ol.

Synthesis of [2-[1,3-benzothiazol-2-yl(6-hydroxyhexyl) hydrazonomethyl]-4-(4-ethylcyclohexanecarbonyl)oxy-phenyl]4-(6-prop-2-enoyloxyhexoxy)benzoate Compound 46.

The compounds 46 was prepared according to the process described in example 6 for compound 13 except that the compound 11 was replaced by the compound 47 and the compound 9 was replaced by compound 6.

$^1$H NMR (400 MHz, DMSO-d6) δ: 8.15; (d, 2H), 7.85; (s, 1H), 7.79; (d, 1H), 7.58; (m, 2H), 7.42; (d, 1H), 7.27; (m, 2H), 7.14; (m, 3H), 6.32; (dd, 1H), 6.17; (dd, 1H), 5.93; (d, 1H), 4.27; (t, 1H), 4.19; (t, 2H), 4.09; (m, 4H), 3.26; (m, 2H), 2.61; (tt, 1H), 2.10; (d, 2H), 1.90-0.95; (m, 25H), 0.88; (t, 3H).

Liquid crystal phase transition: $T_{(Cr-N)}$: 110° C., $T_{(N-I)}$: 111.5° C.

Example 25

Synthesis of Compound 48

Synthesis of 7-[amino(1,3-benzothiazol-2-yl)amino]heptanenitrile Compound 49.

The compound 49 was prepared according to the process described in example 4 for compound 10 except that 6-bromohexane was replaced by 7-bromoheptanenitrile.

Synthesis of [3-[(E)-[1,3-benzothiazol-2-yl(6-cyanohexyl)hydrazono]methyl]-4-(4-ethylcyclohexanecarbonyl)oxy-phenyl]4-(6-prop-2-enoyloxyhexoxy)benzoate Compound 48.

The compounds 48 was prepared according to the process described in example 6 for compound 13 except that the compound 11 was replaced by the compound 49 and the compound 9 was replaced by compound 6.

$^1$H NMR (400 MHz, DMSO-d6) δ: 8.12; (dd, 2H), 7.84; (m, 1H), 7.78; (d, 1H), 7.58; (m, 2H), 7.42; (d, 1H), 7.30; (m, 2H), 7.14; (m, 3H), 6.32; (dd, 1H), 6.16; (dd, 1H), 5.93; (d, 1H), 4.21; (t, 2H), 4.10; (m, 4H), 2.60; (tt, 1H), 2.35; (t, 2H), 2.12; (d, 2H), 1.95-0.95; (m, 25H), 0.86; (t, 3H).

Liquid crystal phase transition: $T_{(Cr-N)}$: 104.5° C., $T_{(N-I)}$: 107.5° C.

Example 26

Synthesis of Compound 50

Synthesis of ethyl 8-[amino(1,3-benzothiazol-2-yl)amino]octanoate Compound 51

The compound 51 was prepared according to the process described in example 4 for compound 10 except that 6-bromohexane was replaced by ethyl 8-bromooctanoate.

Synthesis of [2-[1,3-benzothiazol-2-yl-(8-ethoxy-8-oxo-octyl)hydrazonomethyl]-4-(4-ethylcyclohexanecarbonyl)oxy-phenyl]4-(6-prop-2-enoyloxyhexoxy)benzoate Compound 50

The compounds 50 was prepared according to the process described in example 6 for compound 13 except that the compound 11 was replaced by the compound 51 and the compound 9 was replaced by compound 6.

$^1$H NMR (400 MHz, DMSO-d6) δ: 8.15; (d, 2H), 7.80; (m, 2H), 7.58; (m, 2H), 7.42; (d, 1H), 7.34; (m, 2H), 7.23; (m, 3H), 6.31; (d, 1H), 6.16; (dd, 1H), 5.93; (d, 1H), 4.20; (t, 2H), 4.10; (m, 4H), 2.62; (tt, 1H), 2.15; (m, 2H), 1.95-1.00; (m, 31H), 0.89; (t, 3H).

Liquid crystal phase transition: $T_{(Cr-N)}$: 81.3° C., $T_{(N-I)}$: 84.5° C.

Example 27

Synthesis of Compound 52

Synthesis of [2-[1,3-benzothiazol-2-yl(6-prop-2-enoyloxyhexyl)hydrazonomethyl]-4-(4-ethylcyclohexanecarbonyl)oxy-phenyl]4-(6-prop-2-enoyloxyhexoxy)benzoate Compound 52.

To 29 g (36.3 mmol) of compound 46 in 135 mL of THF and BHT (30 mg) was added N,N-dimethylaniline (11.9 g, 98.1 mmol). This solution is cooles down to −5° C. and acryloyldichloride (8.2 g, 90.8 mmol) and 4-dimethal aminopyridine (443.6 mg, 3.63 mmol) is added dropwise. After the addition the solution is warmed to room temperature and let it stirring for 18 hours. The moisture is filtered off and the solid washed with Ethylacetate. The solid is then recrystalised in 450 mL of diisopropylether to give 28.8 g of off-white solid.

$^1$H NMR (400 MHz, DMSO-d6) δ: 8.15; (d, 2H), 7.88; (s, 1H), 7.78; (d, 1H), 7.58; (m, 2H), 7.41; (m, 1H), 7.30; (m, 2H), 7.14; (m, 3H), 6.34; (m, 2H), 6.15; (m, 2H), 5.89; (m, 2H), 4.21; (t, 2H), 4.15; (m, 4H), 3.95; (t, 2H), 2.58; (tt, 1H), 2.12; (d, 2H), 1.92-0.80; (m, 28H).

Liquid crystal phase transition: $T_{(Cr-N)}$: 84.5° C., $T_{(N-I)}$: 86.8° C.

Application

Example 19: /Preparation of an Orientation Layer using Photoalignment Materials

A glass substrate was spin-coated with a Photoalignment Composition (PAC). The film was dried at 80° C. for 30 s and the resulting film thickness was about 100 nm. Then the film was exposed to aligning light, which was collimated and linearly polarized UV (LPUV) light (280-320 nm) with 500 mJ/cm$^2$. The plane of polarization was 0° with regard to a reference edge on the substrate.

Example 20

A 15.0 wt % solution of compound 1 was prepared by mixing 14.693 w % compound 1, 0.075 w % of inhibitor 2,6-di-tert-butyl-4-methylphenol (to prevent premature polymerisation), 0.15 w % of photoinitiator Irgacure 369 and 0.150 w % of Tinuvin 123 in cyclohexanone and stirred thoroughly till the solid is completely dissolved at room temperature. The coating liquid was applied onto a glass plate with the orientation layer of Example 19 to form a liquid crystal film by spin coating. This film was dried at 140° C. for 2 min onto a temperature controlled hot plate. The sample was cooled down to room temperature and then photo-polymerised by irradiation with UV light using a Mercury lamp for approximately 2 min at room temperature under N$_2$ atmosphere to fix the orientation state of the liquid crystal.

Alignment quality of the liquid crystal in the film is checked by placing the film between two crossed polarizers and adjusted to obtain dark state. The alignment quality is defined to be very good, if the dark state show no defects and the liquid crystal is well oriented. The alignment quality is defined to be good if the dark state has light leakage because of liquid crystal's inhomogeneous orientation. The alignment quality is defined to be medium if the dark state has light leakage with some areas with crystallisation. The alignment quality is defined to be bad, if the liquid crystal is not oriented with absence of dark state. The resulting film of example 20 exhibited a good alignment quality.

Example 21

A film was prepared as in Example 20, with the single difference that the compound 1 was replaced by the compound 4. This film was dried at 135° C. for 2 min onto a

Example 22

A film was prepared as in Example 20, with the single difference that the compound 1 was replaced by compound 7. This film was dried at 120° C. for 5 min onto a temperature controlled hot plate. The resulting film exhibited a good alignment quality.

Example 23

A film was prepared as in Example 20, with the single difference that the compound 1 was replaced by compound 10. This film was dried at 60° C. for 2 min onto a temperature controlled hot plate. The resulting film exhibited a very good alignment quality.

Example 24

A film was prepared as in Example 20, with the single difference that the compound 1 was replaced by compound 12. This film was dried at 55° C. for 2 min onto a temperature controlled hot plate. The resulting film exhibited a good alignment quality.

Example 25

A film was prepared as in Example 20, with the single difference that the compound 1 was replaced by compound 13. This film was dried at 65° C. for 2 min onto a temperature controlled hot plate. The resulting film exhibited a very good alignment quality.

Example 26

A 30 wt % solution of compound 14 was prepared by mixing 28.485 wt % compound 14, 0.015 wt % of inhibitor 2,6-di-tert-butyl-4-methylphenol, 0.3 wt % of photoinitiator Irgacure® Oxe 03 (manufactured by BASF Corporation), 0.9 wt % of [3-(3-sulfanylpropanoyloxy)-2,2-bis(3-sulfanyl-propanoyloxymethyl)propyl]3-sulfanylpropanoate, 0.3 wt % of Tego® flow 425 in cyclohexanone and stirred thoroughly till the solid was completely dissolved at room temperature. The coating liquid was applied onto a glass plate with the orientation layer of Example 19 to form a liquid crystal film by spin coating. This film was dried at 74° C. for 2 min onto a temperature controlled hot plate. The sample was cooled down to room temperature and then photo-polymerised by irradiation with UV light using a Mercury lamp for approximately 2 min at room temperature under N2 atmosphere to fix the orientation state of the liquid crystal. The resulting film exhibited a very good alignment quality.

Example 27

A film was prepared as in Example 20, with the single difference that the compound 1 was replaced by compound 17. This film was dried at 165° C. for 2 min onto a temperature controlled hot plate. The resulting film exhibited a good alignment quality.

Example 28

A film was prepared as in Example 20, with the single difference that the compound 1 was replaced by compound 18. This film was dried at 150° C. for 2 min onto a temperature controlled hot plate. The resulting film exhibited a good alignment quality.

Example 29

A film was prepared as in Example 26, with the single difference that the compound 14 was replaced by compound 19. This film was dried at 57° C. for 2 min onto a temperature controlled hot plate. The resulting film exhibited a very good alignment quality.

Example 30

A film was prepared as in Example 26, with the single difference that the compound 14 was replaced by compound 21. This film was dried at 30° C. for 5 min onto a temperature controlled hot plate. The resulting film exhibited a good alignment quality.

Example 31

A film was prepared as in Example 26, with the single difference that the compound 14 was replaced by compound 23. This film was dried at 45° C. for 5 min onto a temperature controlled hot plate. The resulting film exhibited a very good alignment quality.

Example 32

A film was prepared as in Example 26, with the single difference that the compound 14 was replaced by compound 25. This film was dried at 73° C. for 2 min onto a temperature controlled hot plate. The resulting film exhibited a medium alignment quality.

Example 33

A film was prepared as in Example 20, with the single difference that the compound 1 was replaced by compound 26. This film was dried at 120° C. for 5 min onto a temperature controlled hot plate. The resulting film exhibited a good alignment quality.

Example 34

A film was prepared as in Example 20, with the single difference that the compound 1 was replaced by compound 32. This film was dried at 132° C. for 2 min onto a temperature controlled hot plate. The resulting film exhibited a medium alignment quality.

Example 35

A film was prepared as in Example 20, with the single difference that the compound 1 was replaced by compound 33. This film was dried at 142° C. for 2 min onto a temperature controlled hot plate. The resulting film exhibited a very good alignment quality.

Example 36

A film was prepared as in Example 20, with the single difference that the compound 1 was replaced by compound 35. This film was dried at 125° C. for 2 min onto a temperature controlled hot plate. The resulting film exhibited a medium alignment quality.

Example 36A

A film was prepared as in Example 26, with the single difference that the compound 14 was replaced by compound 36. This film was dried at 39° C. for 5 min onto a temperature controlled hot plate. The resulting film exhibited a good alignment quality.

Example 36B

A film was prepared as in Example 26, with the single difference that the compound 14 was replaced by compound 40. This film was dried at 85° C. for 2 min onto a temperature controlled hot plate. The resulting film exhibited a very good alignment quality.

Example 36C

A film was prepared as in Example 26, with the single difference that the compound 14 was replaced by compound 42. This film was dried at 80° C. for 10 min onto a temperature controlled hot plate. The resulting film exhibited a good alignment quality.

Example 36D

A film was prepared as in Example 26, with the single difference that the compound 14 was replaced by compound 44. This film was dried at 77° C. for 10 min onto a temperature controlled hot plate. The resulting film exhibited a bad alignment quality.

Example 36E

A film was prepared as in Example 26, with the single difference that the compound 14 was replaced by compound 46. This film was dried at 53° C. for 5 min onto a temperature controlled hot plate. The resulting film exhibited a good alignment quality.

Example 36F

A film was prepared as in Example 26, with the single difference that the compound 14 was replaced by compound 48. This film was dried at 58° C. for 5 min onto a temperature controlled hot plate. The resulting film exhibited a good alignment quality.

Example 36G

A film was prepared as in Example 26, with the single difference that the compound 14 was replaced by compound 50. This film was dried at 30° C. for 5 min onto a temperature controlled hot plate. The resulting film exhibited a good alignment quality.

Example 36H

A film was prepared as in Example 26, with the single difference that the compound 14 was replaced by compound 52. This film was dried at 30° C. for 5 min onto a temperature controlled hot plate. The resulting film exhibited a medium alignment quality.

Comparative Example 1

A film was prepared as in Example 26, with the single difference that compound 14 was replaced by [3-[(E)-(1,3-benzothiazol-2-ylhydrazono)methyl]-4-[4-(6-prop-2-enoyloxyhexoxy)benzoyl]oxy-phenyl]4-(6-prop-2-enoyloxyhexoxy)benzoate described in the patent application WO2012/141245 (Zeon Corporation). This film was dried at 49° C. for 5 min onto a temperature controlled hot plate. The resulting film exhibited a very good alignment quality.

Example 36G

Synthesis of Compound 55 (for Comparative Example 2) Synthesis of 2-hydroxy-2-(4-propylcyclohexyl)benzaldehyde compound 53

Magnesium chloride (13.08 g, 137.04 mmol), triethylamine (37.08 g, 366.4 mmol) and then paraformaldehyde (19.25 g) was added to a suspension of 4-(Trans-4-propylcyclohexyl)phenol (20 g, 91.6 mmol) in 250 ml of acetonitrile. The mixture was stirred at ambient temperature for 4 h. 25% of a hydrochloric acid solution was added dropwise to the previous mixture cooled down to 0° C. The solution was then extracted with ethyl acetate and the resulting organic phase was dried over sodium sulfate and concentrated under vacuum. The solid was then purified by column chromatography with eluent heptane:Ethylacetate (9:1) to give 19.1 g of white solid.

Synthesis of [2-formyl-4-(4-propylcyclohexyl)phenyl]4-(6-prop-2-enoyloxyhexoxy)benzoate Compound 54

DCC (5.02 g, 0.24 mol) was added to a mixture of compound 53 (5 g, 0.201 mol), 4-(6-prop-2-enoyloxyhexoxy)benzoic acid (6.5 g, 0.223 mol) and 4-dimethylaminopyridine (0.248 g, 0.002 mol) in 50 mL of dichloromethane. The reaction mixture was stirred at ambient temperature overnight. The mixture was filtered through Hyflo☐ super Cell☐ and the solution was concentrated under vacuum. The residue was further purified by recrystallisation in 100 ml of methanol. The compound 54 was obtained as a white solid (7.4 g).

Synthesis of [2-[1,3-benzothiazol-2-yl(hexyl)hydrazonomethyl]-4-(4-propylcyclohexyl)phenyl]4-(6-prop-2-enoyloxyhexoxy)benzoate compound 55 described in the patent application of DIC corporation US20180346614.

The comparative example 2 was prepared according to the process described in example 4 for compound 10 except that the compound 6 was replaced by the compound 54.

1H NMR (400 MHz, DMSO-d6) ☐: 8.15; (d, 2H), 7.85; (m, 3H), 7.61; (d, 1H), 7.31; (m, 3H), 7.12; (m, 3H), 6.31; (d, 1H), 6.20; (dd, 1H), 5.93; (d, 1H), 4.20; (t, 2H), 4.12; (m, 4H), 2.62; (tt, 1H), 1.95-0.80; (m, 34H), 0.75; (t, 3H).

Liquid crystal phase transition: T(Cr-N): 141° C., T(N-I): 147° C.

Comparative Example 2

A film was prepared as in Example 26, with the single difference that compound 14 was replaced by [3-[(E)-[1,3-benzothiazol-2-yl(hexyl)hydrazono]methyl]-4-(4-propylcyclohexyl)phenyl]4-(6-prop-2-enoyloxyhexoxy)benzoate compound 55 described in the patent described in the patent application of DIC corporation US20180346614. This film was dried at for 5 min onto a temperature of 135° C. controlled by hot plate. The resulting film exhibited no alignment.

Example 37

The retardation of the samples described in example 20 to example 36H and the Comparative example 1, were measured with an Ellipsometer. The table 1 shows the values of $Re_{450}/Re_{550}$ and $Re_{650}/Re_{550}$ for each sample. The $Re_{450}$ represents the retardation of the film at a wavelength of 450 nm, $Re_{550}$ the retardation of the film at a wavelength of 550 nm and $Re_{650}$ the retardation of the film at a wavelength of 650 nm.

TABLE 1

| Example | $Re_{450}/Re_{550}$ | $Re_{650}/Re_{550}$ |
| --- | --- | --- |
| 20 | 0.72 | 1.06 |
| 21 | 0.72 | 1.06 |
| 22 | 0.74 | 1.07 |
| 23 | 0.81 | 1.03 |
| 24 | 0.82 | 1.03 |
| 25 | 0.82 | 1.04 |
| 26 | 0.81 | 1.02 |
| 27 | 0.74 | 1.02 |
| 28 | 0.74 | 1.05 |
| 29 | 0.79 | 1.04 |
| 30 | 0.87 | 1.02 |
| 31 | 0.84 | 1.04 |
| 32 | 0.81 | 1.03 |
| 33 | 0.72 | 1.06 |
| 34 | 0.85 | 1.02 |
| 35 | 0.72 | 1.05 |
| 36 | 0.82 | 1.04 |
| 36A | 0.84 | 1.04 |
| 36B | 0.80 | 1.03 |
| 36C | 0.67 | 1.07 |
| 36E | 0.82 | 1.03 |
| 36F | 0.80 | 1.03 |
| 36G | 0.81 | 1.03 |
| 36H | 0.88 | 1.01 |
| Comparative example 1 | 0.90 | 1.00 |
| Comparative example 2 | No Alignment | |

When using the liquid crystal composition film as a retarder plate or like, having $0.7 < Re_{450}/Re_{550} < 0.9$ is preferred because uneven color and viewing angle characteristics are improved. Moreover for improving color a value of $Re_{650}/Re_{550}$ higher than 1.00 and below 1.2 is preferred. From Table 1, $Re_{650}/Re_{550}$ of the liquid crystal polymerisation films from example 20 to example 36H are found to be significantly larger than $Re_{650}/Re_{550}$ of the liquid crystal polymerisation film from comparative example 1 with most of the values $\geq 1.02$. On the other hand, $R_{450}/Re_{550}$ of the liquid crystal polymerisation films from example 20 to example 37 was lower than $Re_{450}/Re_{550}$ of the liquid crystal polymerisation film from comparative example 1 with all values<0.90. Thus, retarders with a $Re_{650}/Re_{550}$ up to 1.07 could be produced from the polymerisable liquid crystal of the invention.

Example 38

A 30.0 wt % solution of compound 13 was prepared by mixing 25.485 wt % compound 13, 0.015 wt % of inhibitor 2,6-di-tert-butyl-4-methylphenol, 0.6 wt % of photoinitiator Irgacure® Oxe O3 (manufactured by BASF Corporation), 0.6 wt % of [3-(3-sulfanylpropanoyloxy)-2,2-bis(3-sulfanyl-propanoyloxymethyl)propyl]3-sulfanylpropanoate, 0.3 wt % of Tego® flow 425, 3 wt % of O5-[4-[3-methyl-4-[4-[5-oxo-5-(2-prop-2-enoyloxyethoxy)pentanoyl]oxybenzoyl]oxy-phenoxy]carbonylphenyl]O1-(2-prop-2-enoyloxyethyl) pentanedioate LCP1, described in the patent US2012114907, in cyclohexanone and stirred thoroughly till the solid was completely dissolved at room temperature. The film was prepared as described in example 20 and was dried at 68° C. for 2 min onto a temperature controlled hot plate. The resulting film exhibited a very good alignment quality.

Example 39

A 15.0 wt % solution of compound 13 was prepared by mixing 11.243 wt % compound 13, 0.0075 wt % of inhibitor 2,6-di-tert-butyl-4-methylphenol, 0.3 wt % of Irgacure® Oxe 03, 0.3 wt % of [3-(3-sulfanyl propanoyloxy)-2,2-bis (3-sulfanylpropanoyloxymethyl)propyl]3-sulfanylpropanoate, 0.3 wt % of Tego® flow 425, 3 wt % of 05-[4-[3-methyl-4-[4-[5-oxo-5-(2-prop-2-enoyloxyethoxy)pentanoyl] oxybenzoyl]oxy-phenoxy]carbonylphenyl]O1-(2-prop-2-enoyloxyethyl) pentanedioate LCP1 (described in the patent US2012114907) in cyclohexanone and stirred thoroughly till the solid was completely dissolved at room temperature. The film was prepared as described in example 20 and was dried at 68° C. for 2 min onto a temperature controlled hot plate. The resulting film exhibited a very good alignment quality.

Example 40

A 35.0 wt % solution of compound 13 was prepared by mixing 32.883 wt % compound 13, 0.0175 wt % of inhibitor 2,6-di-tert-butyl-4-methylphenol, 0.7 wt % of Irgacure® Oxe 03, 1.05 wt % of [3-(3-sulfanyl propanoyloxy)-2,2-bis (3-sulfanylpropanoyloxymethyl)propyl]3-sulfanylpropanoate, 0.35 wt % of Tego® flow 425 in cyclohexanone and stirred thoroughly till the solid was completely dissolved at room temperature. The film was prepared as described in example 20 and was dried at 64° C. for 2 min onto a temperature controlled hot plate. The resulting film exhibited a very good alignment quality.

Example 41

A 26.0 wt % solution of compound 13 was prepared by mixing 22.607 wt % compound 13, 0.013 wt % of inhibitor 2,6-di-tert-butyl-4-methylphenol, 0.520 wt % of Irgacure® Oxe03, 1.3 wt % of [3-(3-sulfanyl propanoyloxy)-2,2-bis(3-sulfanylpropanoyloxymethyl)propyl]3-sulfanylpropanoate, 0.26 wt % of Tego® flow 425, 1.3 wt % of [4-[6-(4-prop-2-enoyloxybutoxycarbonyloxy)naphthalene-2-carbonyl] oxyphenyl]6-(4-prop-2-enoyloxybutoxycarbonyloxy)naphthalene-2-carboxylate LCP2 (described in U.S. Pat. No. 7,670,505 B2) in cyclohexanone and stirred thoroughly till the solid was completely dissolved at room temperature. The film was prepared as described in example 20 and was dried at 68° C. for 2 min onto a temperature controlled hot plate. The resulting film exhibited a very good alignment quality.

Example 42

The retardation of the samples described in example 39 to example 42 was measured with an Ellipsometer. The table 2 shows the results of the retardation for the different films depending on the liquid crystal composition.

TABLE 2

| Example | Compound | LCP | $Re_{450}/Re_{550}$ | $Re_{650}/Re_{550}$ |
| --- | --- | --- | --- | --- |
| 38 | 13 | 1 | 0.86 | 1.03 |
| 39 | 13 | 1 | 0.91 | 1.02 |

TABLE 2-continued

| Example | Compound | LCP | $Re_{450}/Re_{550}$ | $Re_{650}/Re_{550}$ |
|---------|----------|-----|---------------------|---------------------|
| 40 | 13 | 0 | 0.82 | 1.04 |
| 41 | 13 | 2 | 0.87 | 1.03 |

When using the liquid crystal composition film described in example 39 to example 42 is found to be possible to fine-tune the retardation and to obtain $Re_{450}/Re_{550}$ and $Re_{650}/Re_{550}$ values on request by modifying the proportion of the different components of the liquid crystal composition.

The invention claimed is:

1. An anisotropic compound of formula (I)

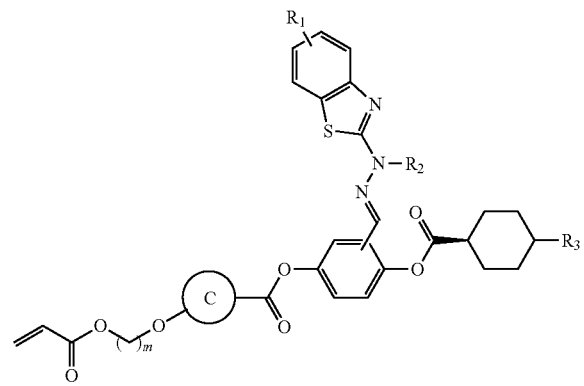

(I)

wherein $R_1$ is selected from the group consisting of hydrogen, $C_1$-$C_{12}$ straight alkyl chain, $C_3$-$C_{12}$ branched alkyl chain, $C_3$-$C_{12}$ alkenyl, $C_1$-$C_{12}$ alkoxy, $C_3$-$C_{12}$ alkenyloxy, —$(CH_2)_q$—$C(CH_3)_3$, $NO_2$, CN, COR, —COOR, —OCOR, —CONR'R, —NR'COR, OCOOR, —OCONR'R, —NR'COOR, —F, —Cl, —$CF_3$ and —$OCF_3$;

in which q is an integer between 0 and 12;

R is selected from the group consisting of hydrogen, a $C_{1-18}$ alkyl group, a $C_{3-18}$ alkenyl group with a double bond at $C_3$-$C_{18}$-position, —$(CH_2)_p$—$C$—$(CF_3)_3$, CN and unsubstituted or substituted phenyl ring, wherein the substituent of the phenyl ring is selected from the group consisting of $C_1$-$C_6$ straight alkyl chain, $C_3$-$C_6$ branched alkyl chain, $C_1$-$C_6$ alkoxy, —C—$(CH_3)_3$, halogen, —$CF_3$, $NO_2$, CN, COR''', —COOR''', —OCOR''', —CONR''R''', —NR''COR''', OCOOR''', —OCONR''R''', —NR''COOR''', —F, —Cl, —$CF_3$ and —$OCF_3$;

in which

R'' is selected from the group consisting of hydrogen, a lower alkyl group, which is a $C_{1-6}$ achiral, straight-chained alkyl group or a $C_{3-6}$ achiral, branched-chained alkyl group, and a lower alkenyl group, which is $C_{3-6}$ achiral, branched or straight chained alkenyl group;

R''' is selected from the group consisting of hydrogen, a $C_{1-18}$ alkyl group and a $C_{3-18}$ alkenyl group with a double bond at $C_3$-$C_{18}$-position;

p is an integer between 0 and 12;

R' is selected from the group consisting of hydrogen, lower alkyl group, which is a $C_{1-6}$ achiral, straight-chained alkyl group or a $C_{3-6}$ achiral, branched-chained alkyl group, lower alkenyl, which is $C_{3-6}$ achiral, branched or straight chained alkenyl group, and lower alkoxy, which is $C_{1-6}$ achiral, straight changed alkoxy group or $C_{3-6}$ achiral, branched chained alkoxy group;

$R_2$ is selected from the group consisting of hydrogen, a substituted or unsubstituted alkyl group having 1 to 20 carbon atoms, a substituted or unsubstituted alkenyl group having 2 to 20 carbon atoms, a substituted or unsubstituted cycloalkyl group having 3 to 12 carbon atoms, a substituted or unsubstituted alkynyl group having 2 to 20 carbon atoms, wherein one or more carbon atoms may be replaced by —O—, —COO—, —OCO—, —OOC—, —O(CO)O—, —N=, —$NR^a$—, —CON=, —CO—$R^b$, —NH—$R^c$, wherein $R^a$ is a $C_1$-$C_{12}$ alkyl group, $R^b$ and $R^c$ are independently from each other a substituted or unsubstituted alkyl group having 1 to 20 carbon atoms, or an organic group having 2 to 30 carbon atoms that includes at least one aromatic ring, or a substituted or unsubstituted alkenyl group having 2 to 20 carbon atoms, or a substituted or unsubstituted cycloalkyl group having 3 to 12 carbon atoms;

$R_3$ is selected from the group consisting of $C_1$-$C_{12}$ alkyl chain, $C_2$-$C_{12}$ alkenyl and —CN—;

Ring C is selected from the group consisting of phenyl, biphenyl, naphthyl, cycloalkyl, bicycloalkyl,

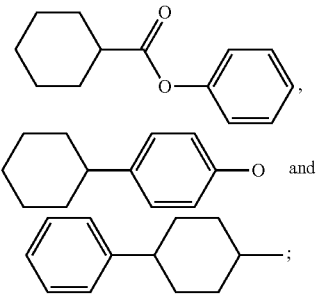

m is an integer between 1 and 24.

2. The anisotropic compound according to claim 1, wherein, $R_1$ is selected from the group consisting of hydrogen, lower alkyl, which is a $C_{1-6}$ achiral, straight-chained alkyl group or a $C_{3-6}$ achiral, branched-chained alkyl group, lower alkenyl, which is $C_{3-6}$ achiral, branched or straight chained alkenyl group, lower alkoxy, which is $C_{1-6}$ achiral, straight chained alkoxy group or $C_{3-6}$ achiral, branched chained alkoxy group, lower alkenyloxy, which is $C_{3-6}$ achiral, branched or straight-chained alkenyloxy group, —F and —$CF_3$.

3. The anisotropic compound according to claim 1, wherein $R_1$ is selected from the group consisting of H, methyl, methoxy, —F, —C—$(CH_3)_3$ and —$CF_3$.

4. The anisotropic compound according to claim 1, wherein R2 is selected from the group consisting of hydrogen and a substituted or unsubstituted alky group having 1 to 12 carbon atoms.

5. The anisotropic compound according to claim 1, wherein $R_3$ is selected from $C_1$-$C_{12}$ alkyl chain or —CN—.

6. The anisotropic compound according to claim 1, wherein ring C is phenyl.

7. The anisotropic compound according to claim 1, wherein PG represents an acrylate or a methacrylate group.

8. An LCP mixture comprising the compound of formula (I) according to claim 1.

9. The LCP mixture according to claim 8 which is in cross-linked or polymerised form.

10. An LCP network comprising the compound according to claim 1.

11. A process for the manufacturing an optical film comprising an anisotropic compound according to claim 1, by exposure to aligning light.

12. An optical film comprising the anisotropic compound of formula (I) according to claim 1.

13. Use of A method comprising use of a compound according to claim 1 in the manufacture of an optical or an electro-optical device.

14. An optical or electro-optical device including the compound according to claim 1.

15. An LCP network comprising the LCP mixture according to claim 8.

16. A process for the manufacturing an optical film comprising a LCP mixture according to claim 8, by exposure to aligning light.

17. A process for the manufacturing an optical film comprising a LCP network according to claim 10, by exposure to aligning light.

18. An optical film comprising the LCP mixture according to claim 8.

19. An optical film comprising the LCP network according to claim 10.

20. A method comprising using the LCP mixture according to claim 8 in the manufacture of an optical or an electro-optical device.

21. A method comprising using the LCP network according to claim 10, in the manufacture of an optical or an electro-optical device.

22. An optical or electro-optical device including the LCP mixture according to claim 8.

23. An optical or electro-optical device including the LCP network according to claim 10.

24. An anisotropic compound of formula (II)

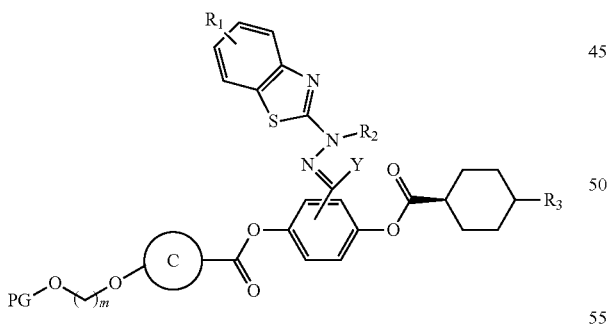

(II)

wherein
$R_1$ is selected from the group consisting of hydrogen, $C_1$-$C_{12}$ straight alkyl chain, $C_3$-$C_{12}$ branched alkyl chain, $C_3$-$C_{12}$ alkenyl, $C_1$-$C_{12}$ alkoxy, $C_3$-$C_{12}$ alkenyloxy, —(CH$_2$)$_q$—C(CH$_3$)$_3$, NO$_2$, CN, COR, —OCOR, —CONR'R, —NR'COR, OCOOR, —OCONR'R, —NR'COOR, —F, —Cl, —CF$_3$ and —OCF$_3$;
in which
q is an integer between 0 and 12;
R is selected from the group consisting of hydrogen, a $C_{1-18}$ alkyl group, a $C_{3-18}$ alkenyl group with a double bond at $C_3$-$C_{18}$-position, —(CH$_2$)$_p$—C—(CF$_3$)$_3$, CN and unsubstituted or substituted phenyl ring, wherein the substituent of the phenyl ring is selected from the group consisting of $C_1$-$C_6$ straight alkyl chain, $C_3$-$C_6$ branched alkyl chain, $C_1$-$C_6$ alkoxy, —C—(CH$_3$)$_3$, halogen, —CF$_3$, NO$_2$, CN, COR''', —COOR''', —OCOR''', —CONR''R''', —NR''COR''', OCOOR''', —OCONR''R''', —NR''COOR''', —F, —Cl, —CF$_3$ and —OCF$_3$;

in which
R'' is selected from the group consisting of hydrogen, a lower alkyl group, which is a $C_{1-6}$ achiral, straight-chained alkyl group or a $C_{3-6}$ achiral, branched-chained alkyl group, and a lower alkenyl group, which is $C_{3-6}$ achiral, branched or straight chained alkenyl group;
R''' is selected from the group consisting of hydrogen, a $C_{1-18}$ alkyl group and a $C_{3-18}$ alkenyl group with a double bond at $C_3$-$C_{18}$-position;
p is an integer between 0 and 12;
R' is selected from the group consisting of hydrogen, lower alkyl, which is a $C_{1-6}$ achiral, straight-chained alkyl group or a $C_{3-6}$ achiral, branched-chained alkyl group, lower alkenyl, which is $C_{3-6}$ achiral, branched or straight chained alkenyl group, and lower alkoxy, which is $C_{1-6}$ achiral, straight chained alkoxy group or $C_{3-6}$ achiral, branched chained alkoxy group;
$R_2$ is selected from the group consisting of hydrogen, a substituted or unsubstituted alkyl group having 1 to 20 carbon atoms, a substituted or unsubstituted alkenyl group having 2 to 20 carbon atoms, a substituted or unsubstituted cycloalkyl group having 3 to 12 carbon atoms, a substituted or unsubstituted alkynyl group having 2 to 20 carbon atoms, wherein one or more carbon atoms may be replaced by —O—, —COO—, —OCO—, —OOC—, —O(CO)O—, —N—, —NR$^a$—, —CON—, —CO—R$^b$, —NH—R$^c$, wherein R$^a$ is a $C_1$-$C_{12}$ alkyl group, R$^b$ and R$^c$ are independently from each other a substituted or unsubstituted alkyl group having 1 to 20 carbon atoms, or an organic group having 2 to 30 carbon atoms that includes at least one aromatic ring, or a substituted or unsubstituted alkenyl group having 2 to 20 carbon atoms, or a substituted or unsubstituted cycloalkyl group having 3 to 12 carbon atoms;
$R_3$ is selected from the group consisting of $C_1$-$C_{12}$ alkyl chain, $C_2$-$C_{12}$ alkenyl and —CN—;
Y is selected from the group consisting of H and substituted or unsubstituted alkyl group having 1 to 12 carbon atoms;
Ring C is selected from the group consisting of phenyl, biphenyl, naphthyl, cycloalkyl, bicycloalkyl,

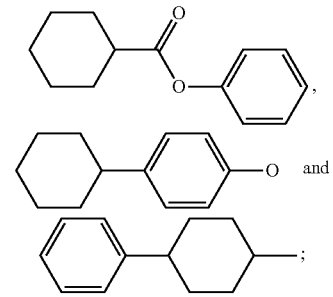

Substituent PG in the group of formula (II) represents a polymerisable group selected from the group consisting of $CH_2=C(Ph)-$, $CH_2=CW-COO-$, $CH_2=CH-COO-Ph-$, $CH_2=CW-CO-NH-$, $CH_2=CH-O-$, $CH_2=CH-OOC-$, $Ph-CH=CH-$, $CH_2=CH-Ph-$, $CH_2=CH-Ph-O-$, $R^d-Ph-CH=CH-COO-$, $R^d-OOC-CH=CH-Ph-O-$ and 2-W-epoxyethyl, in which W represents H, branched-chained alkyl group, and $R^d$ represents a lower alkyl, which is a $C_{1-6}$ achiral, straight-chained alkyl group or a $C_{3-6}$ achiral, branched-chained alkyl group, with the proviso that when $R^d$ is attached to a phenylene group (—Ph—) it may also represent hydrogen or a lower alkoxy, which is $C_{1-6}$ achiral, straight chained alkoxy group or $C_{3-6}$ achiral, branched chained alkoxy group;

m is an integer between 1 and 24.

25. The anisotropic compound according to claim 24, wherein $R_1$ is selected from the group consisting of hydrogen, lower alkyl, which is a $C_{1-6}$ achiral, straight-chained alkyl group or a $C_{3-6}$ achiral, branched-chained alkyl group, lower alkenyl, which is $C_{3-6}$ achiral, branched or straight chained alkenyl group, lower alkoxy, which is $C_{1-6}$ achiral, straight chained alkoxy group or $C_{3-6}$ achiral, branched chained alkoxy group, lower alkenyloxy, which is $C_{3-6}$ achiral, branched or straight-chained alkenyloxy group, —F and —$CF_3$.

26. The anisotropic compound according to claim 24, wherein $R_1$ is selected from the group consisting of H, methyl, methoxy, —F, —C—$(CH_3)_3$ and —$CF_3$.

27. The anisotropic compound according to claim 24, wherein $R_2$ is selected from the group consisting of hydrogen and a substituted or unsubstituted alky group having 1 to 12 carbon atoms.

28. The anisotropic compound according to claim 24, wherein $R_3$ is selected from $C_1$-$C_{12}$ alkyl chain or —CN—.

29. The anisotropic compound according to claim 24, wherein ring C is phenyl.

30. An LCP mixture comprising the compound of formula (II) according to claim 24.

31. The LCP mixture according to claim 30 which is in cross-linked or polymerised form.

32. An LCP network comprising the compound according to claim 24.

33. A process for the manufacturing an optical film comprising an anisotropic compound according to claim 24, by exposure to aligning light.

34. An optical film comprising the anisotropic compound of formula (II) according to claim 24.

35. A method comprising use of a compound according to claim 24 in the manufacture of an optical or an electro-optical device.

36. An optical or electro-optical device including the compound according to claim 24.

37. An LCP network comprising the LCP mixture according to claim 30.

38. A process for the manufacturing an optical film comprising a LCP mixture according to claim 30, by exposure to aligning light.

39. A process for the manufacturing an optical film comprising a LCP network according to claim 32, by exposure to aligning light.

40. An optical film comprising the LCP mixture according to claim 30.

41. An optical film comprising the LCP network according to claim 32.

42. A method comprising using the LCP mixture according to claim 30 in the manufacture of an optical or an electro-optical device.

43. A method comprising using the LCP network according to claim 32, in the manufacture of an optical or an electro-optical device.

44. An optical or electro-optical device including the LCP mixture according to claim 30.

45. An optical or electro-optical device including the LCP network according to claim 32.

* * * * *